(12) United States Patent
Davey et al.

(10) Patent No.: US 10,008,912 B2
(45) Date of Patent: Jun. 26, 2018

(54) MAGNETIC DRIVE DEVICES, AND RELATED SYSTEMS AND METHODS

(71) Applicant: NATIONAL OILWELL VARCO, L.P., Houston, TX (US)

(72) Inventors: Kent R. Davey, Edgewater, FL (US); David Cardellini, Spring, TX (US); Cliff A. Swiontek, Brea, CA (US)

(73) Assignee: NATIONAL OILWELL VARCO, L.P., Houston, TX (US)

( * ) Notice: Subject to any disclaimer, the term of this patent is extended or adjusted under 35 U.S.C. 154(b) by 906 days.

(21) Appl. No.: 14/381,698

(22) PCT Filed: Mar. 1, 2013

(86) PCT No.: PCT/US2013/028679
§ 371 (c)(1),
(2) Date: Aug. 28, 2014

(87) PCT Pub. No.: WO2013/131008
PCT Pub. Date: Sep. 6, 2013

(65) Prior Publication Data
US 2015/0048705 A1    Feb. 19, 2015

Related U.S. Application Data

(60) Provisional application No. 61/606,305, filed on Mar. 2, 2012, provisional application No. 61/653,353, filed (Continued)

(51) Int. Cl.
*H02K 21/12* (2006.01)
*H02K 21/02* (2006.01)
(Continued)

(52) U.S. Cl.
CPC ............... *H02K 21/12* (2013.01); *E21B 4/00* (2013.01); *H02K 7/11* (2013.01); *H02K 16/02* (2013.01);
(Continued)

(58) Field of Classification Search
CPC ...... H02K 49/00; H02K 49/06; H02K 49/102; H02K 49/106; H02K 51/00; H02K 7/06;
(Continued)

(56) References Cited

U.S. PATENT DOCUMENTS 5,723,928 A    3/1998    Imai et al.
6,794,781 B2    9/2004    Razzell et al.
(Continued)

FOREIGN PATENT DOCUMENTS

EP    0018835 A1    11/1980
JP    2005315370 A    11/2005
(Continued)

OTHER PUBLICATIONS

Kais Atallah et al., "A New PM Machine Topology for Low-Speed, High-Torque Drives," Proceedings of the 2008 International Conference on Electrical Machines, Paper ID 1455, IEEE, 2008, pp. 1-4.
(Continued)

*Primary Examiner* — Joshua Benitez Rosario
*Assistant Examiner* — Leda Pham
(74) *Attorney, Agent, or Firm* — Jones Robb, PLLC

(57) ABSTRACT

A magnetic drive device may comprise a stator comprising a plurality of windings for generating a first number of magnetic pole pairs and a rotor comprising a plurality of permanent magnets for generating a second number of magnetic pole pairs that differs from the first number of magnetic pole pairs. The magnetic drive device may further comprise a plurality of free-spinning interpole elements disposed within an air gap between the stator and the rotor.
(Continued)

The interpole elements may produce a magnetomotive force and harmonically couple the magnetic pole pairs of the stator with the magnet pole pairs of the rotor.

27 Claims, 22 Drawing Sheets

Related U.S. Application Data on May 30, 2012, provisional application No. 61/697,173, filed on Sep. 5, 2012.

(51) Int. Cl.
    *H02K 16/02*     (2006.01)
    *E21B 4/00*     (2006.01)
    *H02K 49/10*     (2006.01)
    *H02K 7/11*     (2006.01)

(52) U.S. Cl.
    CPC ......... *H02K 21/021* (2013.01); *H02K 49/102* (2013.01)

(58) Field of Classification Search
    CPC . H02K 7/10; H02K 7/11; H02K 49/10; F16H 35/00; F16H 35/10; F16H 49/00; F16H 15/02; A63H 33/26; F01D 15/10; F02C 3/113; F02C 7/32; F02C 7/36; H02P 15/00
    USPC .................................. 310/103, 104; 476/11
    See application file for complete search history.

(56) References Cited

U.S. PATENT DOCUMENTS

| | | | |
|---|---|---|---|
| 8,813,591 B2 | 8/2014 | Edwards | |
| 9,013,081 B2 | 4/2015 | Atallah et al. | |
| 9,593,753 B2* | 3/2017 | Davey ................ | H02K 49/102 |
| 2002/0167236 A1 | 11/2002 | Long | |
| 2003/0132003 A1 | 7/2003 | Arauz et al. | |
| 2004/0108781 A1 | 6/2004 | Razzell et al. | |
| 2005/0104465 A1 | 5/2005 | Darday | |
| 2007/0215343 A1* | 9/2007 | McDonald .......... | H02K 49/102 166/105 |
| 2008/0149445 A1 | 6/2008 | Kern et al. | |
| 2011/0037333 A1* | 2/2011 | Atallah ................ | H02K 49/102 310/98 |
| 2011/0042965 A1* | 2/2011 | Atallah .................... | H02K 7/11 290/1 C |
| 2011/0121673 A1* | 5/2011 | Edwards ................. | H02K 7/11 310/103 |
| 2011/0121674 A1* | 5/2011 | Bright .................. | H02K 49/102 310/103 |
| 2011/0127869 A1* | 6/2011 | Atallah .................. | H02K 49/06 310/94 |
| 2011/0253498 A1* | 10/2011 | Montgomery ....... | H02K 49/102 192/84.3 |
| 2012/0291575 A1 | 11/2012 | Edwards | |
| 2013/0134815 A1* | 5/2013 | Powell ................. | H02K 7/1823 310/101 |
| 2015/0018168 A1 | 1/2015 | Davey et al. | |

FOREIGN PATENT DOCUMENTS

| | | | | |
|---|---|---|---|---|
| WO | WO 2011144895 A2 * | 11/2011 | ............... | H02K 7/11 |
| WO | WO 2013/130936 A2 | 9/2013 | | |
| WO | WO 2013/131008 A1 | 9/2013 | | |

OTHER PUBLICATIONS

K. Attallah, et al., "Design, analysis and realisation of a high-performance magnetic gear", IEEE Proc.-Electr. Power Appl., vol. 151, No. 2, Mar. 2004, pp. 135-143.

Linni Jian, et al., "Comparison of Coaxial Magnetic Gears with Different Topologies", IEEE Transactions on Magnetics, vol. 45, No. 10, Oct. 2009, pp. 4526-4529.

Linni Jian and K. T. Chau, "A Coaxial Magnetic Gear with Halbach Permanent-Magnet Arrays", IEEE Transactions on Energy Conversion, vol. 25, No. 2, Jun. 2010, pp. 319-328.

Wenlong Li, et al., "Application of Linear Magnetic Gears for Pseudo-Direct-Drive Oceanic Wave Energy Harvesting", IEEE Transactions on Magnetics, vol. 47, No. 10, Oct. 2011, pp. 2624-2627.

Linni Jian et al., "A Magnetic-Geared Outer-Rotor Permanent-Magnet Brushless Machine for Wind Power Generation", IEEE Transactions on Industry Applications, vol. 45, No. 3, May/Jun. 2009, pp. 954-962.

Frank T. Jørgensen et al., "The Cycloid Permanent Magnetic Gear," IEEE Transactions on Industry Applications, vol. 44, No. 6, Nov./Dec. 2008, pp. 1659-1665.

Nicolas W. Frank and Hamid A. Toliyat, "Gearing Ratios of a Magnetic Gear for Wind Turbines", IEEE Electric Machines and Drives Conference, Apr. 2009, IEEE, pp. 1224-1230.

Linni Jian and K.T. Chau, "A Coaxial Magnetic Gear with Halbach Permanent Magnet Arrays", Manuscript, Apr. 23, 2008, The University of Hong Kong (9 pages).

J. Rens et al., "A novel magnetic harmonic gear", The University of Sheffield, UK, IEEE, 2007, pp. 698-703.

K. Atallah and D. Howe, "A Novel High-Performance Magnetic Gear", IEEE Transactions on Magnetics, vol. 37, No. 4, pp. 2844-2846, Jul. 2001.

Jiabin Wang and Kais Atallah, "Modeling and Control of 'Pseudo' Direct-Drive Brushless Permanent Magnet Machines", IEEE, 2009, pp. 1043-1048.

F. T. Joergensen et al. "The cycloid permanent magnetic gear", Aalborg University, Denmark, IEEE, 2006, pp. 373-378.

Cheng-Chi Huang et al., "Development of a Magnetic Planetary Gearbox", IEEE Transactions on Magnetics, vol. 44, No. 3, Mar. 2008, pp. 403-412.

D. J. Powell et al., "Design and Analysis of a Pseudo Direct-Drive Propulsion Motor", Paper, Magnomatics Limited, UK (2 pages).

Kais Atallah, et al., "A Novel "Pseudo" Direct-Drive Brushless Permanent Magnet Machine", IEEE Transactions on Magnetics, vol. 44, No. 11, Nov. 2008, pp. 4349-4352.

P. O. Rasmussen et al., "Motor Integrated Permanent Magnet Gear with a Wide Torque-Speed Range", IEEE Energy Conversion Congress and Exposition, 2009, pp. 1510-1518.

P. O. Rasmussen et al., "Experimental Evaluation of a Motor Integrated Permanent Magnet Gear", Aalborg University, Denmark, IEEE, 2011, pp. 3982-3989.

Jan Rens et al., "A Novel Magnetic Harmonic Gear", IEEE Transactions on Industry Applications, vol. 46, No. 1, Jan./Feb. 2010, pp. 206-212.

Rawcliffe, G.H., and Garlick, N.L., "Two improved chorded windings for 3:1 pole-changing", The Institution of Electrical Engineers, Paper No. 2443 U, Feb. 1958, pp. 62-66.

P. O. Rasmussen et al., "Development of a High-Performance Magnetic Gear," IEEE Transactions on Industry Applications, vol. 41, No. 3, May/Jun. 2005, pp. 764-770.

S. Mezani et al., "A high-performance axial-field magnetic gear", Journal of Applied Physics 99, 2006.

J.W. Kelly et al., "Control of a continuously operated pole-changing induction machine," IEEE Electric Machines and Drives Conference, vol. 1, 2003, pp. 211-217.

D. Grant, "Design of phase-change 2-speed windings for induction motors, using pole-amplitude modulation techniques," IEEE Proceedings on Power Applications B, vol. 130, No. 1, Jan. 1983, pp. 45-50.

Ge Baoming et al., "Uniform modeling for pole-phase modulation induction motors," IEEE Electric Machines and Systems, 2010, pp. 1401-1406.

Ge Baoming et al., "Winding Design Modeling, and Control for Pole-Phase Modulation Induction Motors", IEEE Transactions on Magnetics, vol. 49, No. 2, Feb. 2013, pp. 898-911.

International Search Report for related International Patent Application No. PCT/US2013/028538, dated May 9, 2013.

(56) References Cited

OTHER PUBLICATIONS

Written Opinion for related International Patent Application No. PCT/US2013/028538, dated May 9, 2013.
Structural Beam Bending Equations Calculation Supported on Both Ends Uniform Loading, Engineering Edge, <http://www.engineersedge.com/beam_bending/beam_bending1.htm>, accessed from the Internet on Oct. 29, 2014.
Engineering Section Properties Solid Round Calculator, Engineering Edge, <http://www.engineersedge.com/calculators/section_square_case_11.htm>, accessed from the Internet on Oct. 29, 2014.
Neodymium Iron Boron Magnets, Dexter Magnetic Technologies, <http://www.dextermag.com/material-grades/neodymium-iron-boron-magnets>, accessed from the Internet on Oct. 29, 2014.
K. Atallah et al., "A high-performance linear magnetic gear", vol. 97, No. 10, May 17, 2005.
Extended European Search Report for Application No. 13754224.7, dated Feb. 2, 2016.
International Search Report for corresponding International Patent Application No. PCT/US2013/028679 dated May 9, 2013.
Written Opinion for corresponding International Patent Application No. PCT/US2013/028679 dated May 9, 2013.
Notice of Allowance from co-pending U.S. Appl. No. 14/381,686, dated Oct. 28, 2016.
Extended European Search Report for related European Application No. 13754518.2, dated Jun. 8, 2016.

\* cited by examiner

MAGNETIC DRIVE DEVICES, AND RELATED SYSTEMS AND METHODS

CROSS-REFERENCE TO RELATED APPLICATIONS

This is a national stage application of PCT/US2013/028679, filed internationally on Mar. 1, 2013, which claims priority to U.S. Provisional Patent Application No. 61/606,305, filed Mar. 2, 2012 and entitled "Integrated Motor-Gear Using Spinning Magnets;" U.S. Provisional Patent Application No. 61/697,173, filed Sep. 5, 2012 and entitled "Magnetic Drive Devices, and Related Systems and Methods;" and U.S. Provisional Patent Application No. 61/653,353, filed May 30, 2012 and entitled "Oil Field Magnetic Drivers and Method of Using Same," each of which is incorporated by reference herein in its entirety.

TECHNICAL FIELD

The present disclosure relates generally to magnetic drive devices, such as, for example, permanent magnet motors and generators, and related systems and methods. More particularly, the present disclosure relates to direct-drive permanent magnet motors that provide an increased torque output.

INTRODUCTION

The section headings used herein are for organizational purposes only and are not to be construed as limiting the subject matter described in any way.

Magnetic drive devices, such as, for example, permanent magnet torque motors and generators can be used as direct drives. Accordingly, permanent magnet motors can eliminate the need for gearboxes, worm-gear drives, and other mechanical-transmission elements and directly couple the payload to the drive. This makes possible drives with relatively high dynamic responses and minimal, if any, hysteresis. Such motors have fewer moving parts, as compared, for example, with pseudo magnetic drives that have multiple rotating magnetic gear rings. Thus, permanent magnet motors can be simpler to construct, more efficient, less prone to failure, and/or have lower overall noise emissions, as compared with their multi-gear counterparts.

Conventional magnetic drive devices, however, generally provide a relatively low torque, or voltage, output due to the limits on magnetic and electrical stresses that can be used. It may, therefore, be desirable to provide a magnetic drive device that has a reduced magnet volume with increased torque or voltage production. It may also be desirable to provide a magnetic drive device that has the ability to change speed at a fixed frequency. It may further be desirable to provide a magnetic drive device that may offload forces from the stator winding to reduce the torque on the stator.

SUMMARY

The present disclosure may solve one or more of the above-mentioned problems and/or achieve one or more of the above-mentioned desirable features. Other features and/or advantages may become apparent from the description which follows.

In accordance with an exemplary embodiment of the present disclosure, a magnetic drive device may comprise a stator comprising a plurality of windings for generating a first number of magnetic pole pairs and a rotor comprising a plurality of permanent magnets for generating a second number of magnetic pole pairs that differs from the first number of magnetic pole pairs. The magnetic drive device may further comprise a plurality of free-spinning interpole elements disposed within an air gap between the stator and the rotor. The interpole elements may produce a magnetomotive force and harmonically couple the magnetic pole pairs of the stator with the magnet pole pairs of the rotor.

In accordance with an additional exemplary embodiment of the present disclosure, a magnetic drive device may comprise a stator comprising a plurality of pole change windings for generating a first number of magnetic pole pairs and a rotor comprising a plurality of permanent magnets for generating a second number of magnetic pole pairs that differs from the first number of magnetic pole pairs. The pole change windings may be configured to change the generated first number of magnetic pole pairs. The magnetic drive device may further comprise a plurality of interpole elements positioned in an air gap between the stator and the rotor. The plurality of interpole elements may be grouped into at least two groups of interpole elements so as to harmonically couple the magnetic pole pairs of the stator with the magnetic pole pairs of the rotor for each generated first number of magnetic pole pairs.

In accordance with a further exemplary embodiment of the present disclosure a method of varying a speed of a magnetic drive device may comprise adjusting a number of magnetic pole pairs generated by a stator. The method may further comprise harmonically coupling the magnetic pole pairs generated by the stator with magnetic pole pairs of a rotor for at least two differing numbers of magnetic pole pairs of the stator from the adjusting.

In yet another exemplary embodiment, the present disclosure contemplates a system that includes a magnetic drive device in accordance with any of the various exemplary embodiments disclose herein and rotary equipment associated with an oil drilling rig operatively coupled to be driven by an output drive shaft of the magnetic drive device.

Additional objects and advantages will be set forth in part in the description which follows, and in part will be obvious from the description, or may be learned by practice of the present disclosure. At least some of the objects and advantages of the present disclosure may be realized and attained by means of the elements and combinations particularly pointed out in the appended claims.

It is to be understood that both the foregoing general description and the following detailed description are exemplary and explanatory only and are not restrictive of the invention, as claimed. It should be understood that the invention, in its broadest sense, could be practiced without having one or more features of these exemplary aspects and embodiments.

BRIEF DESCRIPTION OF DRAWINGS

The accompanying drawings, which are incorporated in and constitute a part of this specification, illustrate some exemplary embodiments of the present disclosure and together with the description, serve to explain certain principles. In the drawings.

DESCRIPTION OF EXEMPLARY EMBODIMENTS

Figure 1:
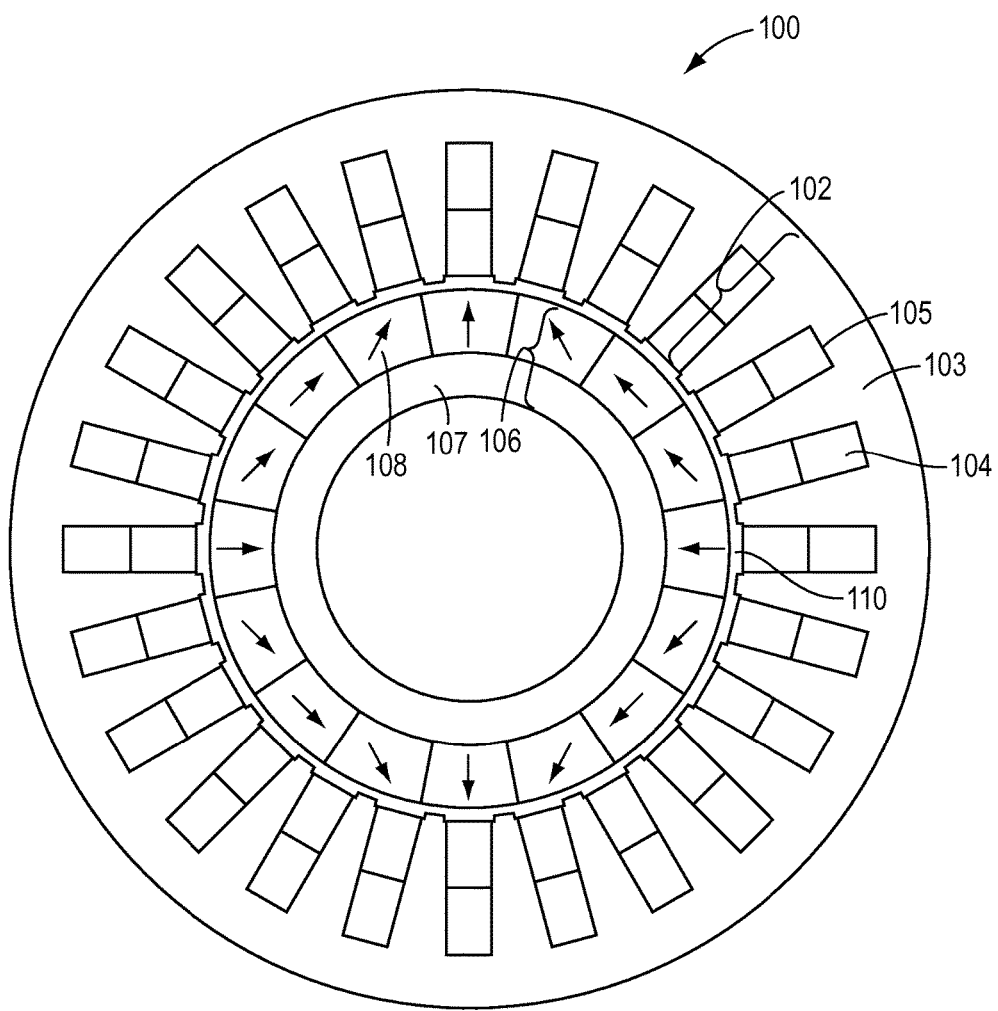
FIG. 1 is a schematic plan view of a conventional permanent magnet motor.

Reference will now be made in detail to various exemplary embodiments of the present disclosure, examples of which are illustrated in the accompanying drawings. Wherever possible, the same reference numbers will be used throughout the drawings to refer to the same or like parts.

Various exemplary embodiments of the present disclosure contemplate magnetic drive devices, such as, for example, permanent magnet motors and generators, that have a reduced magnet volume compared to a conventional permanent magnet motor but with increased torque or voltage production. Various embodiments of the present disclosure contemplate, for example, magnetic drive devices comprising a plurality of free-spinning interpole elements positioned in an air gap between a stator and rotor, wherein the plurality of interpole elements harmonically couple the poles of the stator and rotor and provide a magnetomotive force (MMF) that amplifies the magnetic flux transferred between the stator and rotor. Various embodiments of the present disclosure contemplate, for example, magnetic drive devices comprising a plurality of free-spinning magnetized cylinders positioned in the air gap between the stator and the rotor.

Various additional exemplary embodiments of the present disclosure contemplate magnetic drive devices that change speed at a fixed frequency, such as, for example, variable speed permanent magnet motors. Various additional embodiments of the present disclosure contemplate, for example, magnetic drive devices comprising a stator having a plurality of windings such that the magnetic field generated by the windings may be changed, thereby changing the number of magnetic pole pairs on the stator. Various further embodiments of the present disclosure contemplate a magnetic drive device comprising interpole elements positioned in an air gap between the stator and a rotor, wherein the interpole elements are grouped so as to harmonically couple the poles of the stator and rotor at more than one pole pair count so that coupling may occur between the stator and rotor at more than one pole pair combination.

In various exemplary embodiments of the present disclosure, a magnetic drive device may comprise a stator having a plurality of pole change windings, such that the magnetic field generated by the windings may be changed, thereby changing the number of magnetic pole pairs on the stator. As would be understood by those of ordinary skill in the art, changing the magnetic pole pairs on the stator may be accomplished by changing the manner in which the windings are connected. Thus, pole change windings refer to windings that are configured for multiple connections so as to provide at least one magnetic pole pair change. Various techniques can be used to accomplish such a pole pair change including, but not limited to, for example, pole amplitude modulation (PAM) and pole phase modulation (PWM).

In various additional exemplary embodiments, interpole elements can be placed in an air gap between the members of a magnetic drive device, such as, for example, in an air gap between a stator and a rotor to modulate the magnetic flux transferred between the stator and rotor. Interpole elements, for example, can provide interpoles, which act as auxiliary poles, to harmonically couple the magnetic pole count (or pole pair count) of the stator to the magnetic pole count (or pole pair count) of the rotor. In other words, in various embodiments, the interpole elements harmonically couple the magnetic fields of the stator and rotor when, for example, the rotor has more magnetic pole pairs than the stator. This can result in a torque transfer between the stator and rotor by a ratio of the magnetic pole pairs on the rotor to the magnetic pole pairs on the stator.

As used herein, a rotor is any non-stationary member of a magnetic drive device, such as, for example, the non-stationary member of a permanent magnet motor or generator, which operates in conjunction with a stator (the stationary member of the magnetic drive device) to produce torque or thrust. In various exemplary embodiments of the present disclosure, for example, a rotary permanent magnet motor may comprise a rotor that rotates because the windings and magnetic field of the stator are arranged so that a torque is developed about the rotor's axis. In various additional exemplary embodiments, a linear permanent magnet motor may comprise a rotor that is "unrolled" so that instead of producing a torque (rotation) it produces a thrust (linear force) along its length. Thus, as used herein, the term rotor is not limited to a rotating structure.

FIG. 1 shows a schematic plan view of an exemplary conventional rotary permanent magnet motor 100. The motor 100 comprises a stator 102 and a rotor 106 positioned in an interior of the stator 102 so as to form an air gap 110 between the stator 102 and the rotor 106. The stator 102 comprises a lamination stack 103 having slots 105 (e.g., 24 slots being shown in the embodiment of FIG. 1) and a plurality of electrical field windings 104 (e.g., three-phase windings). The rotor 106 comprises an electrically conductive ring 107 (e.g., made of steel) and a plurality of permanent magnets 108. As illustrated in FIG. 1, for example, in various embodiments, the permanent magnets 108 on the rotor 106 may be arranged in a Halbach array around the rotor 106. Typically, the rotor 106 is mechanically coupled directly to a driven mechanism, such as a shaft that can couple to equipment to be driven for example, (not shown) as would be understood by those of ordinary skill in the art.

The stator 102 is configured to generate a magnetic field via current delivered to the windings 104. That magnetic field cooperates with a magnetic field of the permanent magnets 108 of the rotor 106 to develop a torque about the rotor's axis, thereby rotating the rotor 106. Thus, to couple the stator 102 to the rotor 106, the number of magnetic poles (magnetic pole pairs) generated by the stator 102 is the same as the number of magnetic poles (magnetic pole pairs) of the rotor 106. For example, as illustrated in FIG. 1, the stator 102 may be configured for a 4 pole excitation (or for a 2 pole pair excitation) and the rotor 106 may have permanent magnets 108 providing 4 poles (or 2 pole pairs).

In contrast to the conventional embodiment of FIG. 1, various exemplary embodiments of the present disclosure contemplate magnetic drive devices wherein the stator and rotor have differing numbers of magnetic pole pairs. In various exemplary embodiments, for example, the rotor may have more magnetic pole pairs than the stator, thereby resulting in a torque transfer between the stator and rotor that is increased by a ratio of the magnetic pole pairs on the rotor to the magnetic pole pairs on the stator. Various additional exemplary embodiments of the present disclosure contemplate magnetic drive devices that also provide torque or voltage amplification by increasing the torque or voltage output of the magnetic drive device relative to a conventional magnetic drive device having a similar stator configuration with the same stator excitation frequency.

In various exemplary embodiments of the present disclosure, a stator and rotor having differing numbers of magnetic pole pairs may be coupled via interpole elements disposed within an air gap between the stator and rotor, thereby providing a magnetic drive device having a torque or voltage conversion ratio similar to the gear ratio of a magnetic gear. In various additional exemplary embodiments, the torque, or voltage, output of the magnetic drive device may, for example, also be substantially improved (or amplified) by introducing an additional magnetomotive force (MMF) source to the device. Introducing such an additional MMF can provide magnetic flux that produces an additional physical driving force, for example, on the rotor. Thus, in accordance with the present disclosure, the torque, or voltage, output of a magnetic drive device may be amplified by using interpole elements that are also a MMF source and therefore also produce a magnetic field.

Free-spinning magnetized elements, such as, for example, free-spinning magnetized cylinders (which may include, for example, permanent magnet cylinders and/or temporarily magnetized cylinders that are allowed to rotate freely about their axes), may be used as interpole elements. Although not wishing to be bound by any particular theory, by using magnetized elements as interpole elements, and allowing the magnetized elements to individually rotate, or spin, the magnetic field produced by the interpole magnetized elements is able to align with the magnetic fields produced by the stator and rotor to help rotate the rotor. In other words, the MMF of the interpole elements in accordance with the present disclosure may be utilized to produce additional output torque. And, if the device is being driven as a generator, the additional MMF may produce more prime mover torque for the same output current (i.e., more output voltage). Thus, free-spinning magnetized cylinders, for example configured as in exemplary embodiments disclosed in PCT Application No. PCT/US13/028538, filed on a date even herewith and incorporated by reference in its entirety herein, can be arranged to not only modulate the magnetic flux transferred between the stator and rotor, but also amplify the flux transferred, thereby increasing the torque and/or voltage output of the magnetic drive device.

Figure 2:
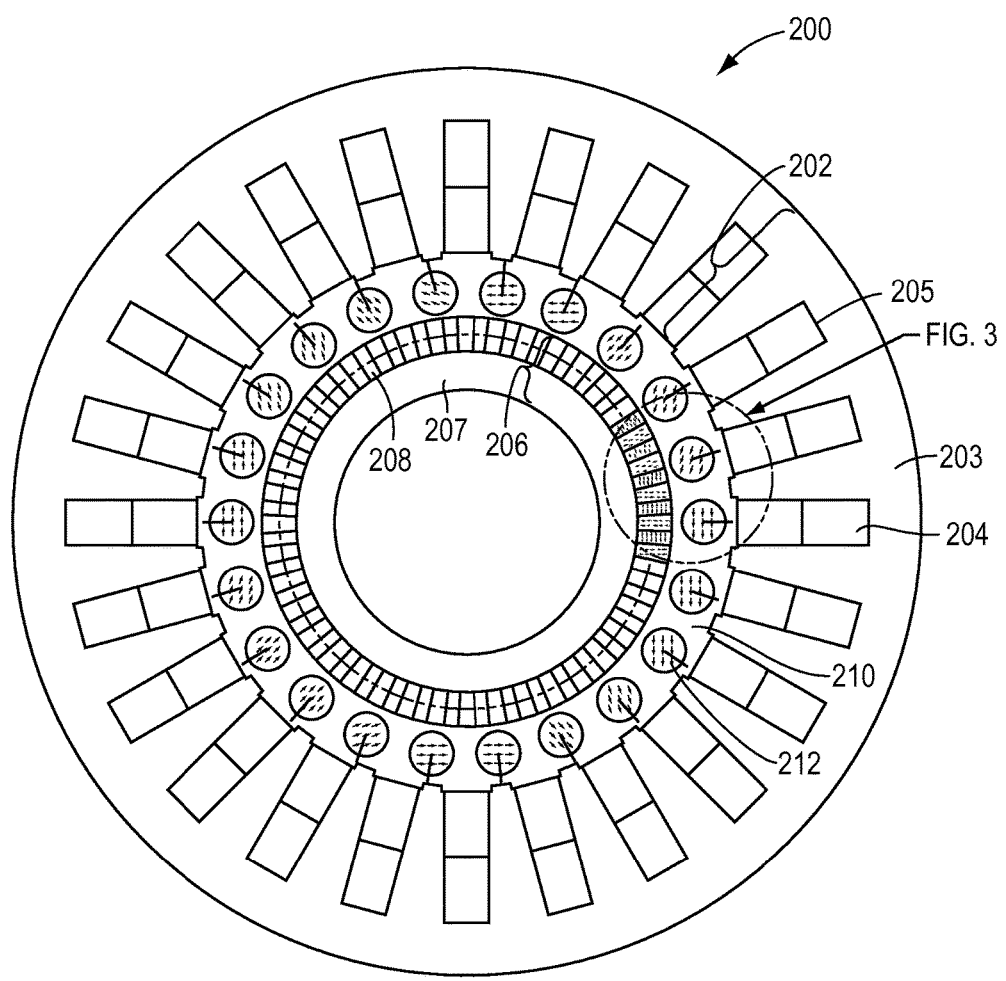
FIG. 2 is a schematic plan view of an exemplary embodiment of a permanent magnet motor in accordance with the present disclosure.

The torque and/or voltage output of a magnetic drive device may, therefore, be amplified by utilizing interpole elements within the air gap between the stator and rotor that are sources of MMF. With reference to the exemplary embodiment of FIGS. 2 and 3, for example, a rotary permanent magnet motor 200 comprises a stator 202 and a rotor 206 positioned in an interior of the stator 202 so as to form an air gap 210 between the stator 202 and the rotor 206. Similar to the stator 102 of the motor 100 of FIG. 1, the stator 202 comprises a lamination stack 203 having slots 205 and a plurality of electrical field windings 204. As illustrated in FIG. 2, for example, in various embodiments the lamination stack 203 may comprise 24 slots 205 and a plurality of three-phase windings 204. Thus, like the stator 102 of FIG. 1, the stator 202 is configured for a 4 pole excitation (or a 2 pole pair excitation).

The rotor 206 comprises an electrically conductive ring 207 (e.g., steel) and a plurality of permanent magnets 208. As illustrated perhaps best in FIG. 3, in various exemplary embodiments, the permanent magnets 208 may be arranged in a partial Halbach array around the rotor 206. In various embodiments, for example, the rotor 204 may have 80 permanent magnets providing 40 poles (or 20 pole pairs).

Figure 3:
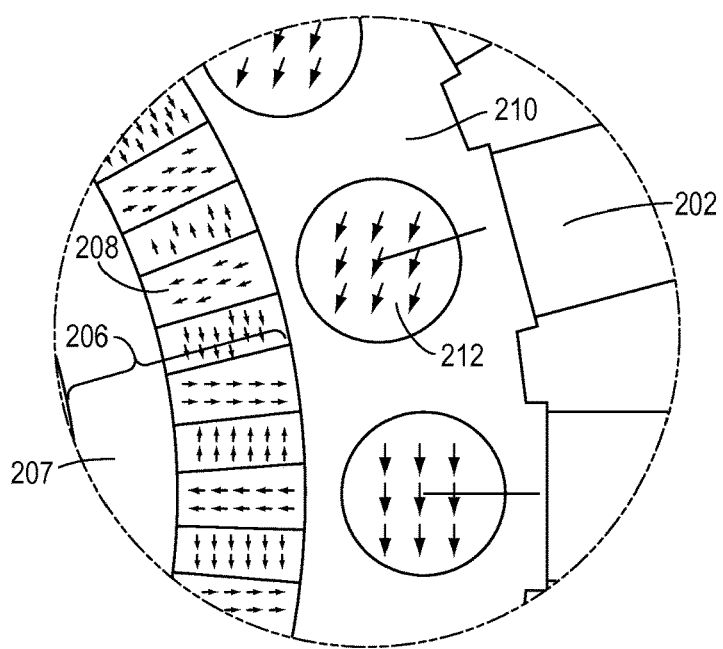
FIG. 3. is an enlarged view of a section of the motor of FIG. 2.

The stator 202 and the rotor 206, therefore, have differing numbers of magnetic pole pairs. As shown in FIGS. 2 and 3, free-spinning magnetized cylinders 212 can be provided as interpole elements positioned in the air gap 210 between the stator 202 and the rotor 206. The cylinders 212 modulate the magnetic fields produced by the stator 202 and the rotor 206 so as to harmonically couple the two fields. Thus, the permanent magnet motor 200 illustrated in FIGS. 2 and 3 would have a 10:1 torque conversion ratio (i.e., the ratio of the number of pole pairs on the rotor 206 to the number of pole pairs on the stator 202). The cylinders 212 are also mounted to freely spin about their axes. This enables the cylinders 212 to orient themselves in a manner to amplify the magnetic flux transferred between the stator 202 and the rotor 206.

Figure 5:
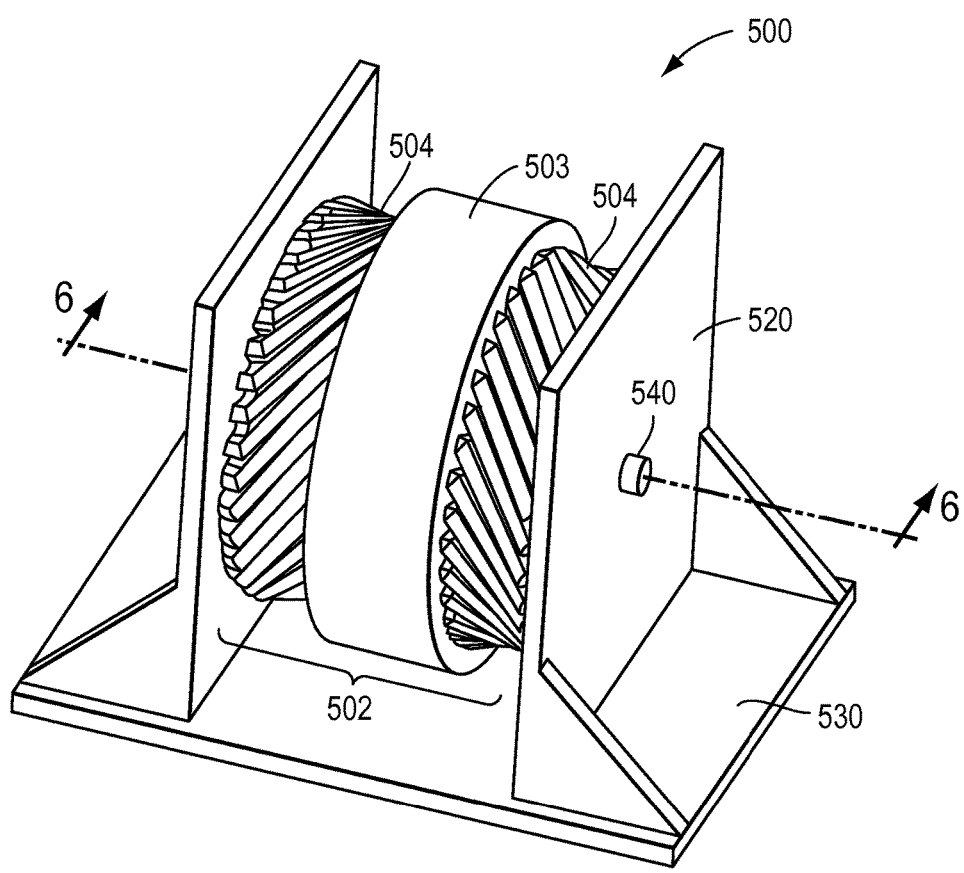
FIG. 5 is a perspective assembled view of another exemplary embodiment of a permanent magnet motor in a support frame in accordance with the present disclosure.
Figure 6:
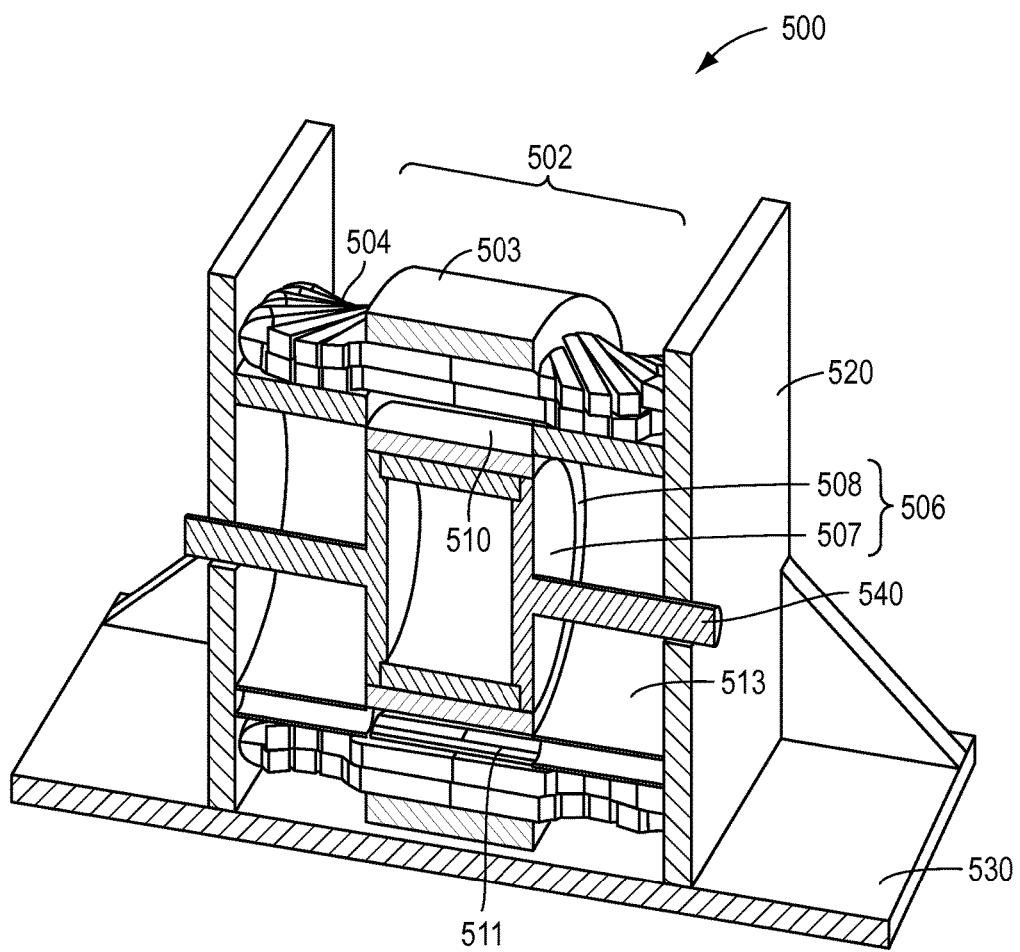
FIG. 6 is a perspective, sectional view of the motor assembly of FIG. 5 taken along line 6-6 of FIG. 5.

With reference to FIGS. 5-10A, for example, various detailed views of another exemplary embodiment of a permanent magnet motor 500 in accordance with the present disclosure are shown. As illustrated in FIGS. 5 and 6, the motor 500 comprises a stator 502 and a rotor 506 positioned in an interior of the stator 502 so as to form an air gap 510 between the stator 502 and the rotor 506. For explanation purposes, FIGS. 5 and 6 illustrate a motor 500 that is assembled for use, for example, within a support frame comprising brackets 520 that are mounted to a base plate 530.

Figure 7:
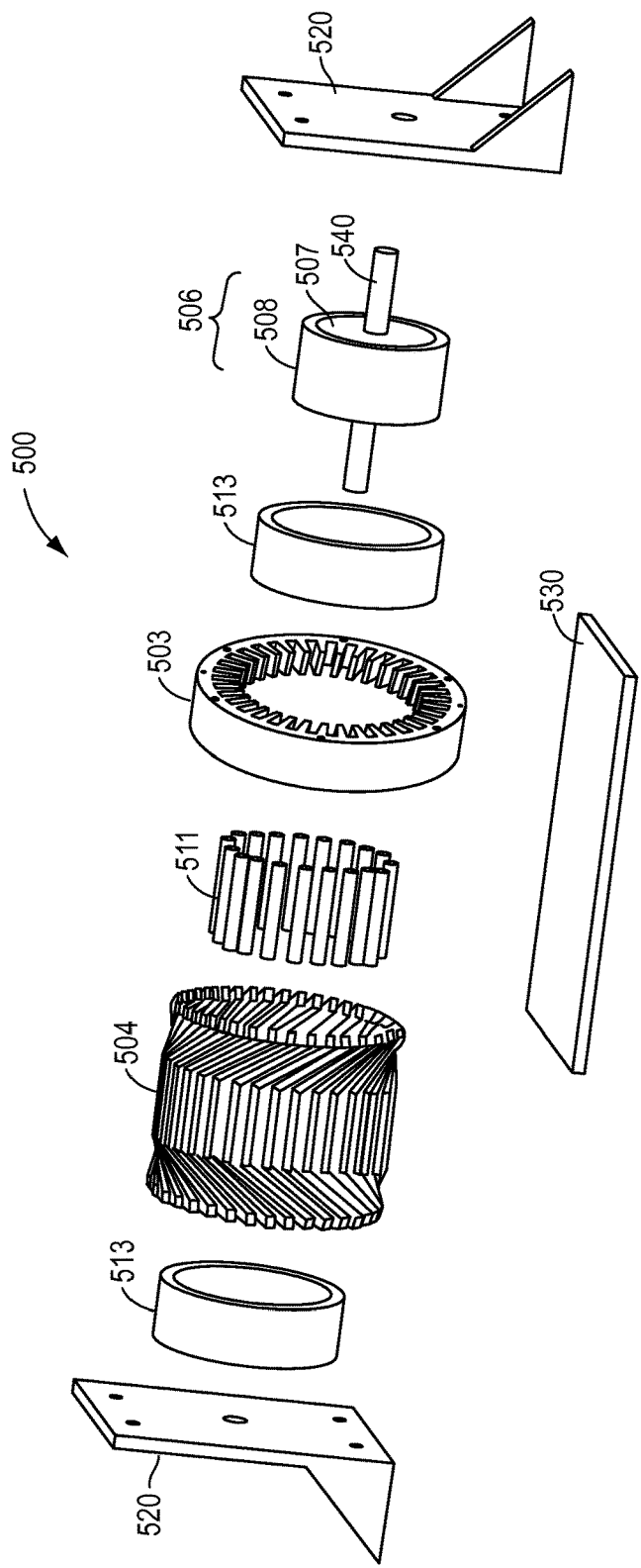
FIG. 7 is perspective exploded view of the motor assembly of FIG. 5.
Figure 8:
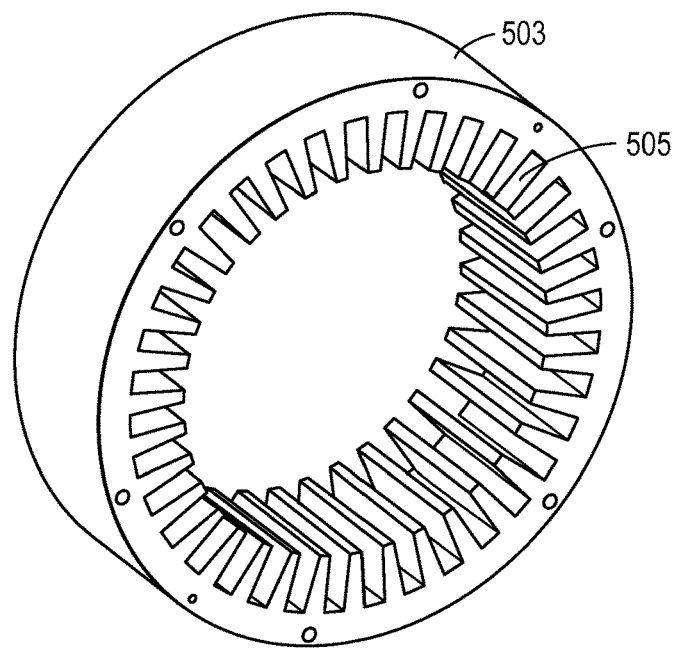
FIG. 8 is perspective view of the lamination stack of the motor of FIG. 5.
Figure 9:
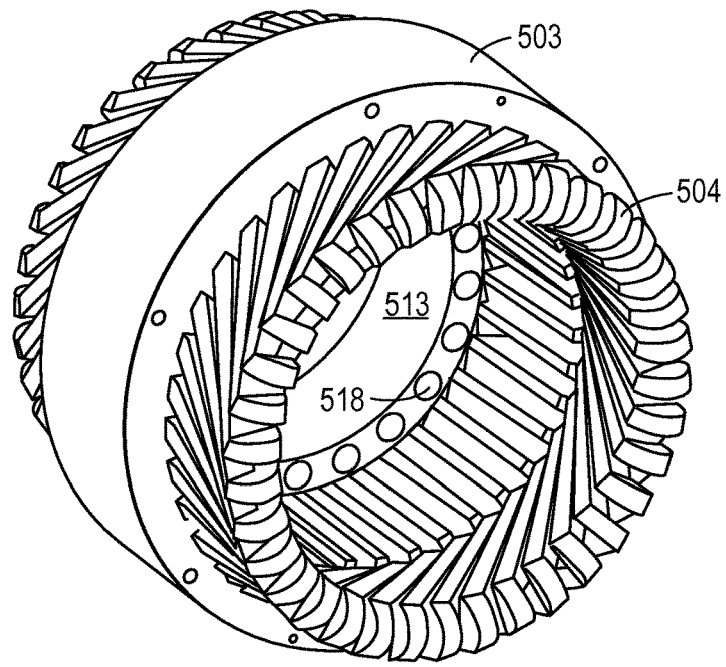
FIG. 9 is a perspective view of the lamination stack and stator windings of the motor of FIG. 5.

As perhaps shown best in FIGS. 8 and 9, the stator 502 comprises a lamination stack 503 having slots 505 and a plurality of electrical field windings 504. In various embodiments, for example, the lamination stack may comprise 36 slots 505 and a plurality of windings 504 as illustrated in FIG. 9. In various embodiments, for example, the windings are connected for a three phase excitation. The rotor 506 comprises an electrically conductive ring 507 (e.g., made of steel) and a plurality of permanent magnets 508 in spaced relation around a periphery of the ring 507 (see FIGS. 6 and 7). As illustrated in FIGS. 5, 6, and 7, in various exemplary embodiments, the rotor 506 may further comprise a shaft 540. As would be understood by those of ordinary skill in the art, the shaft 540 may, for example, be directly coupled to a mechanism to be driven (not shown). In various exemplary embodiments, the present disclosure contemplates coupling the shaft 540 to, for example, various industrial rotary equipment, including but not limited to rotary equipment in oil drilling rigs, such as, for example, top drives, drawworks, and/or mud pumps. Such applications are exemplary and nonlimiting, however, and the magnetic drives described herein can be used in a variety of applications in which it may be desirable to provide a direct drive for equipment.

Free-spinning magnetized cylinders (not shown) are provided as interpole elements positioned in the air gap 510 between the stator 502 and the rotor 506. As perhaps best shown in the exploded view of FIG. 7 and the enlarged view of FIG. 10A, in various embodiments, for example, the cylinders may be housed within tubes, such as, for example, stainless steel pipes (sleeves) 511. As would be understood by those of ordinary skill in the art, electrically insulative end plates 513, such as, for example, plates formed from Delrin®, nylon, or other electrically insulative and high strength material (e.g., plastic material), may aid both in the assembly and support of the free-spinning magnetized cylinders within the air gap 510 of the motor 500. As shown in FIGS. 6 and 7, for example, respective ends of each pipe 511 can be mounted within respective end plates 513 (via, e.g., a bushing or bearing) to support the magnetized cylinders within the air gap 510, and allow the cylinders to freely spin about their axes within the pipes 511. In various embodiments, for example, the end plates 513 may comprise a plurality of recesses 518 configured to accept and support the ends of pipes 511, as perhaps shown best in FIG. 9. As above, allowing the cylinders to freely spin about their axes during the operation of the motor 500, enables the cylinders to orient themselves in a manner to amplify the magnetic flux transferred between the stator 502 and the rotor 506.

Those of ordinary skill in the art would understand that the permanent magnet motor shown and described above with reference to FIGS. 5-10A is exemplary only, and is intended to demonstrate additional views and details of a permanent magnet motor in accordance with the present disclosure. Permanent magnet motors in accordance with the present disclosure may have various sizes, shapes, and/or configurations, including, for example, various sizes, shapes, and/or configurations of stators and/or rotors, having respectively various types, numbers, sizes, shapes and/or configurations of windings and permanent magnets.

Figure 10A:
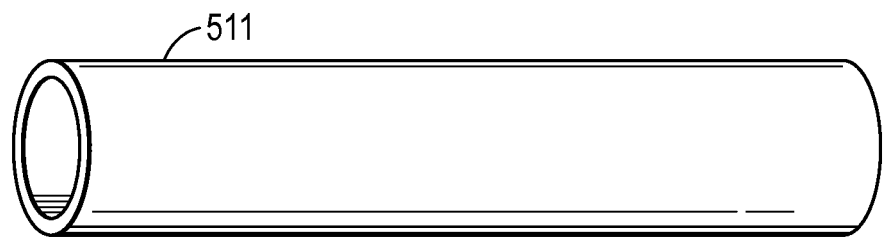
FIG. 10A is a perspective view of a stainless steel pipe of the motor of FIG. 5.
Figure 10B:
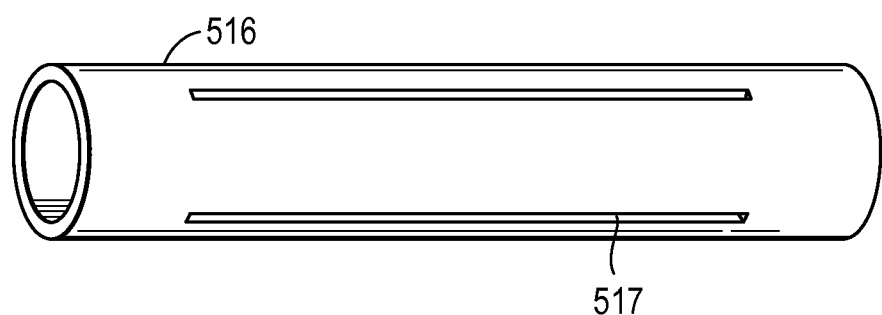
FIG. 10B is a perspective view of another exemplary embodiment of a stainless steel pipe in accordance with the present disclosure.
Figure 11A:
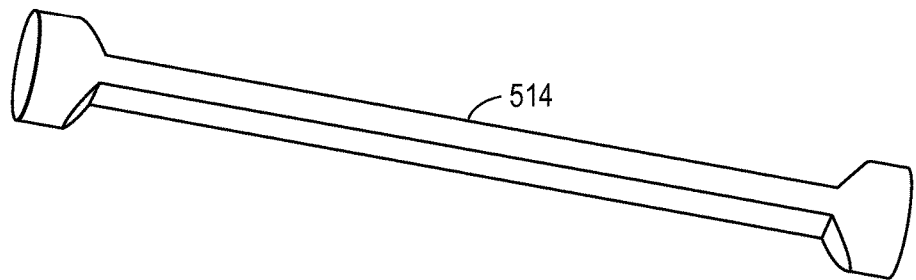
FIGS. 11A and 11B are perspective views of various additional exemplary support mechanisms for interpole elements in accordance with the present disclosure.
Figure 11B:
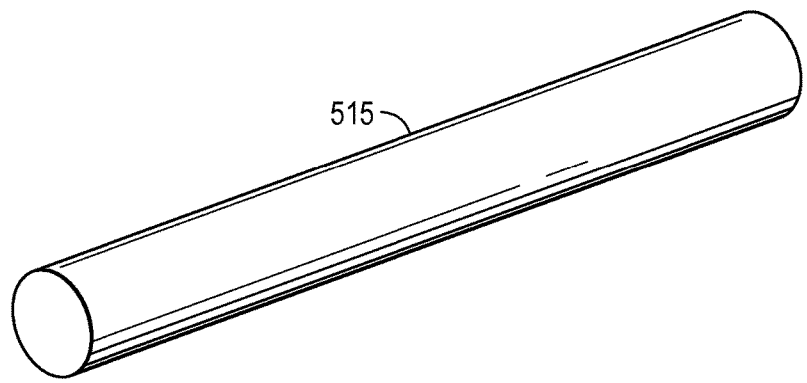

Furthermore, permanent magnet motors in accordance with the present disclosure may have various types, numbers, sizes, shapes, and/or configurations of free-spinning magnetized elements, such as, for example, free-spinning magnetized cylinders, and methods of mounting the free-spinning magnetized elements within the air gap between the stator and rotor. Although in various exemplary embodiments, as described above with reference to FIGS. 5-10A, the free-spinning magnetized cylinders may be disposed within stainless steel pipes 511 that are supported by end plates 513, those of ordinary skill in the art would understand that the free-spinning magnetized cylinders may have various configurations to allow free rotation of the cylinders within the air gap. In various additional embodiments, for example, as shown in FIGS. 11A and 11B, the free-spinning magnetized cylinders may each be supported by an inner ferrous plate 514 or tube 515 disposed down the center of the cylinder and that is accepted and supported by end plates and about which the cylinders are able to rotate. Using inner plates 514, for example, may provide an increased transfer of flux across the air gap between the stator and rotor, while using inner tubes 515 may be less compromising to the cylinders and the MMF produced by the cylinders. In various further exemplary embodiments, the free-spinning magnetized cylinders may comprise stainless steel spindles (not shown) (which are epoxied, for example, to the ends of each cylinder) that are accepted and supported by end plates. Those of ordinary skill in the art would also understand that the stainless steel pipes 511, 514, and 515 are exemplary only, and that various shapes, sizes, and/or materials may be used for the tubes to support the free-spinning magnetized cylinders without departing from the scope of the present disclosure and claims. In various additional embodiments, for example, to minimize eddy current losses within the tubes, the tubes may comprise stainless steel pipes 516 having slots 517 extending, for example, along a longitudinal axis of the tube as illustrated in FIG. 10B.

The end plates 513 may have various configurations and be formed from various electrically insulative materials without departing from the scope of the present disclosure. Supporting the free-spinning magnetized cylinders with an electrically insulative material, such as, for example, Delrin®, may prevent eddy currents from circulating along one cylinder and down an adjacent cylinder.

For additional various exemplary embodiments of configurations of freely spinning magnetic cylinders, and supports therefore used in magnetic gearing assemblies but applicable also to the magnetic direct drives described herein, reference is made to International PCT Application No. PCT/US13/028538, filed on a date even herewith, incorporated by reference herein. Those having ordinary skill in the art would understand that such configurations of the freely spinning magnetic cylinders in that application can be used in the direct drive devices described herein.

As above, permanent magnet motors, such as those described above, may provide torque amplification by increasing the torque output of the motor relative to a conventional permanent magnet motor having a similar stator configuration with the same stator excitation frequency. To demonstrate, for example, the torque amplification of the exemplary motor 200 depicted in FIGS. 2 and 3 relative to the conventional motor 100 depicted in FIG. 1, the motors 100 and 200 were modeled using Oersted© (a finite element field analysis package developed by Integrated Engineering Software).

The motor 100 of FIG. 1 was modeled, for example, with a stator 102 comprising a 21 inch diameter lamination stack 103 of M19 steel with 24 slots 105 and three-phase windings 104 having a ⅚ pitch, and with a rotor 106 comprising 80 45 Mega Gauss Oersteds (MGO) permanent magnets 108 arranged in a Halbach array around the rotor 106. As modeled, the motor 100 had a working stack depth of approximately 6 inches. A current density of 3 MA/m$^2$ rms (mega amps per meters squared root mean square) was assumed in the slots 105, which, as would be understood by one of ordinary skill in the art, corresponds to 5 MA/m$^2$ in the copper windings with a 60% slot fill. Thus, as above, the stator was modeled as a 4 pole excitation (2 pole pair excitation). In operation, the modeled conventional motor 100 generated approximately 1,167 ft-lbs of torque at its peak torque angle of 90 degrees on both the rotor 106 and the stator 102.

The motor 200 of FIGS. 2 and 3 was modeled with a stator 202 that was identical to the stator 102 modeled above (i.e., configured for a 4 pole excitation), and with a rotor 206 comprising 80, 45 MGO permanent magnets 208 arranged in a partial Halbach array around the rotor 206 to provide 40 poles (20 pole pairs). The model also included 22 free-spinning magnetized cylinders 212 positioned in an air gap 210 between the stator 202 and the rotor 206. As modeled, the motor 200 also had a working stack depth of approximately 6 inches.

Using the same stator excitation as the conventional motor 100, in peak torque position, the modeled motor 200 generated approximately 1,711 ft-lbs of torque on the rotor 206, approximately 1,823 ft-lbs of torque on the middle cylinder array, and approximately 112 ft-lbs of torque on the stator 202. Accordingly, although the conventional motor 100 had a greater volume of permanent magnets, it produced about 64 percent of the torque that was produced by the modeled motor 200. In other words, with a decreased volume of permanent magnets, the motor in accordance with the present disclosure generated approximately 46 percent more torque than its conventional counterpart.

As also demonstrated by the torque output of the modeled motor 200, a relatively small torque of 112 ft-lbs was exerted on the stator 202. In other words, the modeled motor 200 was able to offload forces from the stator winding to both the cylinder array in the air gap and the rotor 206. As would be understood by those of ordinary skill in the art, this offloading of forces may, for example, extend the life of the motor by reducing the cyclical forces, for example, fringe and leakage field forces, on the windings and coils of the stator.

Those of ordinary skill in the art would understand that the above motor in accordance with one exemplary embodiment was modeled for exemplary purposes only and that, as above, permanent magnet motors in accordance with the present disclosure may have various sizes, shapes, and/or configurations, including, for example, various sizes, shapes, and/or configurations of stators and/or rotors, having respectively various types, numbers, sizes, shapes and/or configurations of windings and permanent magnets. Furthermore, permanent magnet motors in accordance with the present disclosure may have various types, numbers, sizes, shapes, and/or configurations of free-spinning magnetized interpole elements, such as, for example, free-spinning magnetized cylinders, within the air gap between the stator and rotor. Based on the teachings of the present disclosure, it is therefore within the ability of one skilled in the art to determine a permanent magnet motor design to achieve a desired torque conversion ratio and torque output, and the present disclosure is not intended to be limited to the exemplary embodiments shown and described herein.

Figure 4:
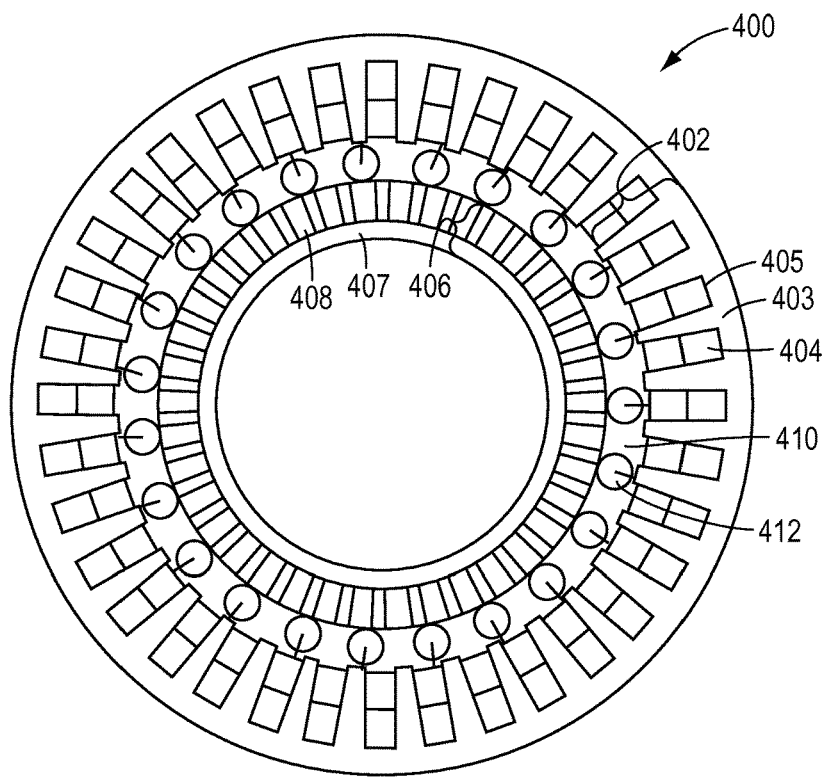
FIG. 4 is a schematic plan view of another exemplary embodiment of a permanent magnetic motor in accordance with the present disclosure.

With reference to FIG. 4, for example, in various embodiments of the present disclosure, a rotary permanent magnet motor 400 may comprise a stator 402 with a lamination stack 403 having slots 405 (e.g., 36 slots) and a plurality of electrical field windings 404 (e.g., three-phase windings). The stator 402 is configured for a 4 pole excitation (or a 2 pole pair excitation). The motor 400 may further comprise a rotor 406 having an electrically conductive ring 407 (e.g., steel) and a plurality of permanent magnets 408. In various embodiments, for example, the rotor 406 may comprise 84 permanent magnets as illustrated in FIG. 4. Thus, the rotor 406 is configured to provide 42 poles (or 21 pole pairs). The 4 pole pairs of the stator 402 can be harmonically coupled with the 21 pole pairs of the rotor 406, for example, via interpole elements. For example, in the exemplary embodiment of FIG. 4, 23 free-spinning magnetized cylinders 412 are positioned in an air gap 410 between the stator 402 and the rotor 406. Thus, the permanent magnet motor 400 illustrated in FIG. 4 has a 21:2 conversion ratio.

When the motor 400 was modeled using Oersted© with relation to a conventional permanent magnet motor having a similar stator with the same stator excitation, the computed torque generation for the motor 400 was approximately 75 percent more torque than its conventional counterpart (2,454 ft-lbs vs. 638 ft-lbs).

Those of ordinary skill in the art will understand that the permanent magnet motors shown and described above with reference to FIGS. 2-11 are exemplary only, and are intended to demonstrate various exemplary embodiments of permanent magnet motors in accordance with the present disclosure, and to illustrate certain principles of the present disclosure, and not to limit the scope of the present disclosure and claims. Accordingly, the techniques and methods disclosed in the present disclosure may be applied to any type and/or configuration of magnetic drive device, including, but not limited to, rotary permanent magnet motors (see FIGS. 1-20) and linear permanent magnet motors (see FIG. 21). Further, the magnetized interpole elements may also be configured to rotate as a group, such as, for example, as a middle ring (not shown) of a motor. In such a configuration, for example, the inner ring of permanent magnets may be stationary and the middle ring of cylinders may function as a rotor rotating about an axis of the motor to produce an output torque. Furthermore, although the exemplary embodiments shown and described above are all with relation to permanent magnet motors, those of ordinary skill in the art would understand that the same principles may be applied to permanent magnet generators to achieve an increased voltage output without departing from the scope of the present disclosure and claims. Accordingly, various exemplary embodiments of the present disclosure contemplate a permanent magnet generator, in which the rotor is turned, for example, by wind or water, and a voltage is induced on the stator windings. In accordance with the principles of the present disclosure, due to the effective conversion ratio of the generator, the device can have an increased voltage output. In other words, the voltage generated will be as if the rotor is being turned considerably faster than it is actually being turned.

Although the permanent magnet motors illustrated in FIGS. 2-11 provide torque amplification, the motors 200, 400, and 500 are limited to one conversion ratio, and therefore only have one speed, and consequently one torque output. In other words, the above motors provide only a single torque output per illustrated motor configuration, and are "static" motors. In accordance with further aspects of the present disclosure, magnetic drive devices, such as the permanent magnet motors illustrated above, may be configured to change speeds, and therefore have variable torque and/o voltage outputs.

Changing the Magnetic Pole Count on the Stator

In accordance with aspects of the present disclosure, a magnetic drive device speed change may be achieved by changing both the magnetic pole count on the stator and the coupling coefficient of the interpole elements.

In various exemplary embodiments of the present disclosure, the number of magnetic pole pairs (pole count) on the stator may be changed, for example, by using pole change windings. As would be understood by those of ordinary skill in the art, the techniques and methods for changing the pole count on a stator without changing the frequency of the supply current to the stator are well known in the art, and are regularly used, for example, in induction motors, such as, for example, in the petroleum and chemical industry where these techniques are used to change speed via a winding reconnection. Such techniques may include, but are not limited to, pole amplitude modulation (PAM) and pole phase modulation (PWM) as would be understood by those of ordinary skill in the art. Accordingly, various exemplary embodiments of the present disclosure contemplate a magnetic drive device comprising a stator having a plurality of pole change windings, such as, for example, Gramme windings.

Changing the Coupling Coefficient of the Interpole Elements

As above, altering the pole count on the stator is one aspect associated with providing a magnetic drive device with the ability to change speeds. Various exemplary embodiments of the present disclosure also consider changing the coupling coefficient of the interpole elements to affect a magnetic flux transfer between the stator and rotor at more than one pole pair count. Thus, when the pole count is altered on the stator, the interpole elements may affect a magnetic flux transfer between the stator and rotor at both the original pole count and the altered pole count.

In various exemplary embodiments of the present disclosure, the coupling coefficient of the interpole elements may, for example, be changed by grouping, or clustering, the interpole elements. In various additional embodiments, the coupling coefficient of the interpole elements may be changed by varying both the size and angular position of the interpole elements. Accordingly, various embodiments of the present disclosure contemplate varying the size and angular position of interpole elements in the form of magnetizable wedges, such as, for example, laminated steel blocks, wedges, or other such configurations (see, e.g., FIGS. 12, 14, and 16); and various additional embodiments contemplate varying the size and angular position of interpole elements in the form of free-spinning magnetized elements, such as, for example, free-spinning magnetized cylinders (see, e.g., FIGS. 18-20).

While not wishing to be bound by any particular theory, it is believed that by varying the size and position of the interpole elements, the coupling coefficient of the interpole elements can be changed so as to modulate the magnetic flux transferred between the stator and rotor at more than one pole pair combination. In other words, the magnetic flux modification can occur at more than one conversion ratio. As shown with respect to FIGS. 12-17 (in which, for ease of explanation, a magnetic gear assembly comprising an outer gear ring of permanent magnets is shown instead of a permanent magnet motor comprising an outer stator of windings), for example, the coupling coefficient of interpole elements, in the form of laminated steel blocks or wedges 612, 712, and 812 in respective middle gear rings 610, 710, and 810, may be changed by both changing the size of the interpole elements and by clustering the interpole elements into respective groups 620, 720, and 820.

Figure 12:
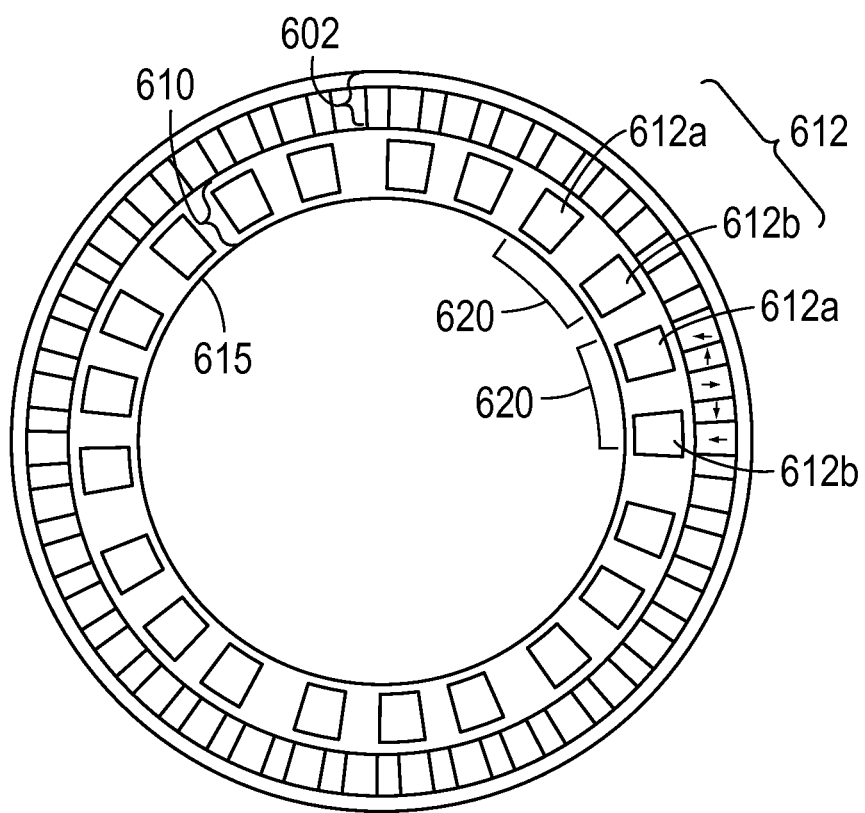
FIG. 12 is a schematic plan view of an exemplary configuration for interpole elements in accordance with the present disclosure.

As shown in FIG. 12, in various embodiments of the present disclosure, for example, steel wedges 612 are clustered into groups 620 of two wedges 612a and 612b, wherein each wedge 612a is slightly thinner than each wedge 612b (e.g., each wedge 612b has a slightly larger angular span than each wedge 612a). Thus, the 21 wedges illustrated in FIG. 12 are grouped into pairs (with one wedge remaining unpaired), wherein each pair is spaced approximately 34.3 degrees from its neighboring pair. In other words, for example, the azimuthal wedge span of the wedges is alternated between 360/22/2 degrees and 360/21/2 degrees.

Figure 13A:
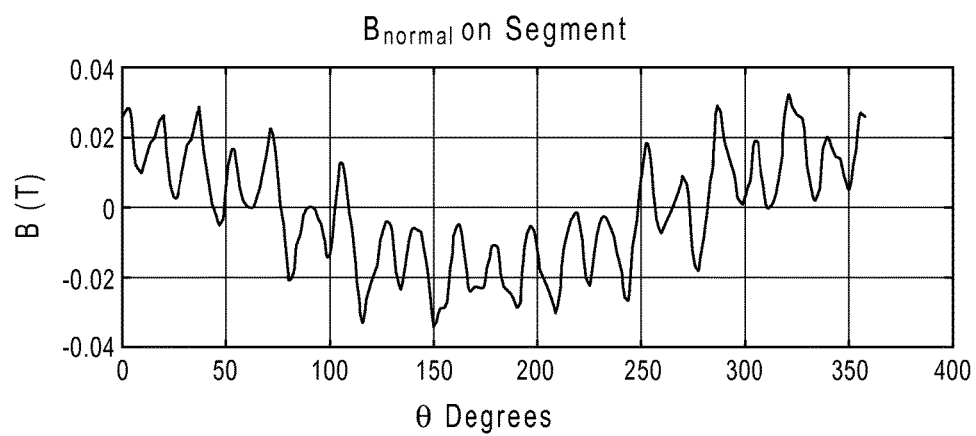
FIGS. 13A and 13B are a radial magnetic B field plot and harmonic field content plot, respectively, for the interpole elements of FIG. 12.
Figure 13B:
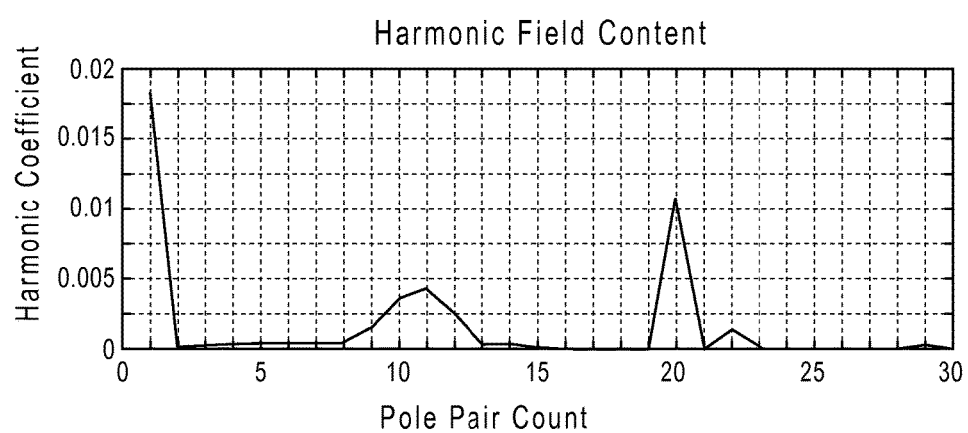

As illustrated in FIG. 13, the radial magnetic B field along an inner perimeter 615 of the middle gear ring 610 may be calculated, for example, with a boundary element code as would be understood by those of ordinary skill in the art. As also illustrated in FIG. 13, the radial magnetic B field can then be represented as a sum of Fourier components, wherein the coupling coefficients (i.e., harmonic coefficients) are computed using standard Fourier analysis as would also be understood by those of ordinary skill in the art. Thus, the harmonic field content plot illustrated in FIG. 13 demonstrates that an outer gear ring 602 having 40 poles (20 pole pairs) can be made to couple to an inner gear ring (not shown) with 1 pole pair (the normative coupling coefficient), 10 pole pairs, 11 pole pairs, and 12 pole pairs. In other words, by varying the size and radial spacing of the steel wedges 612, new coupling options now appear for 10, 11, and 12 pole pairs on an inner gear ring, which respectively correspond to gear ratios of 2:1 (20/10), 1.81:1 (20/11), and 1.667:1 (20:12) for the coupling between the inner magnet ring (not shown) and the outer magnet ring 602. Thus, this pairing of interpole elements generally illustrates that a departure from an even spacing of 360/21 degrees may introduce additional harmonics into the coupling of the outer field source pattern (e.g., the stator) with the inner field source pattern (e.g., the rotor).

Figure 14:
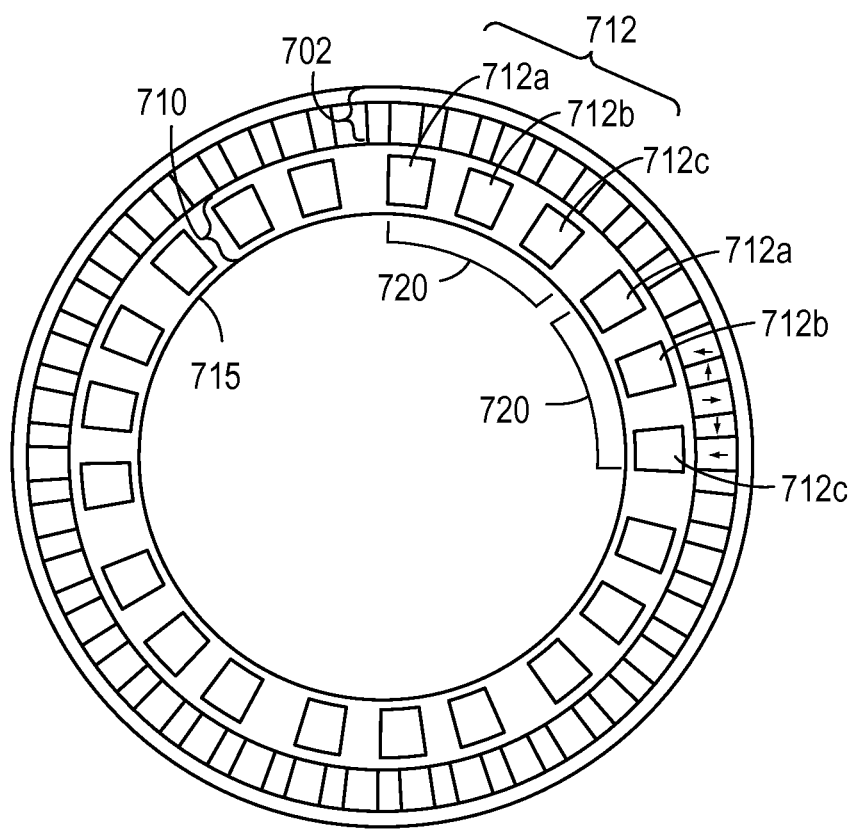
FIG. 14 is a schematic plan view of another exemplary configuration and of interpole elements in accordance with the present disclosure.

In various additional embodiments, as illustrated in FIG. 14, steel wedges 712 are clustered into groups 720 of three wedges 712a, 712b, and 712c of slightly increasing thickness (e.g., of slightly increasing angular span), wedge 712c being the thickest wedge of the group 720. Thus, the 21 wedges illustrated in FIG. 14 are grouped into seven groups of three, wherein each group 720 is spaced approximately 51.4 degrees from its neighboring group 720. In other words, for example, the azimuthal wedge span of the wedges in each group is alternated between 360/23/2 degrees, 360/22/2 degrees, and 360/21/2 degrees.

Figure 15A:
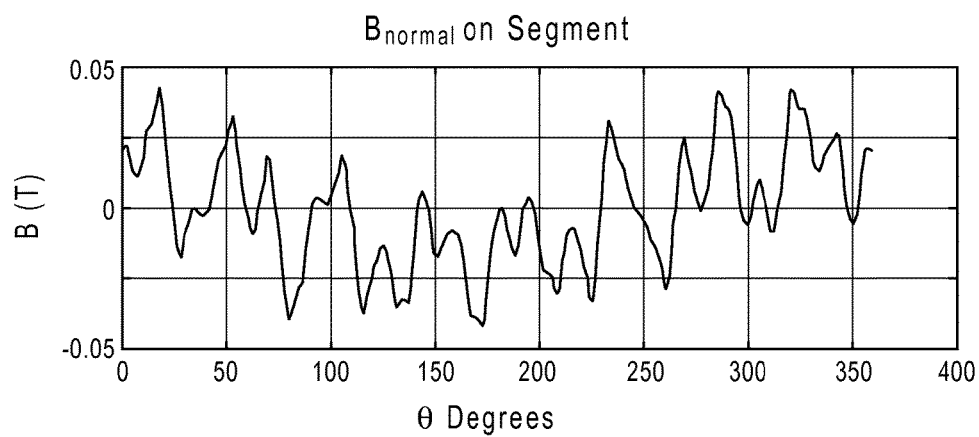
FIGS. 15A and 15B are a radial magnetic B field plot and harmonic field content plot, respectively, for the interpole elements of FIG. 14.
Figure 15B:
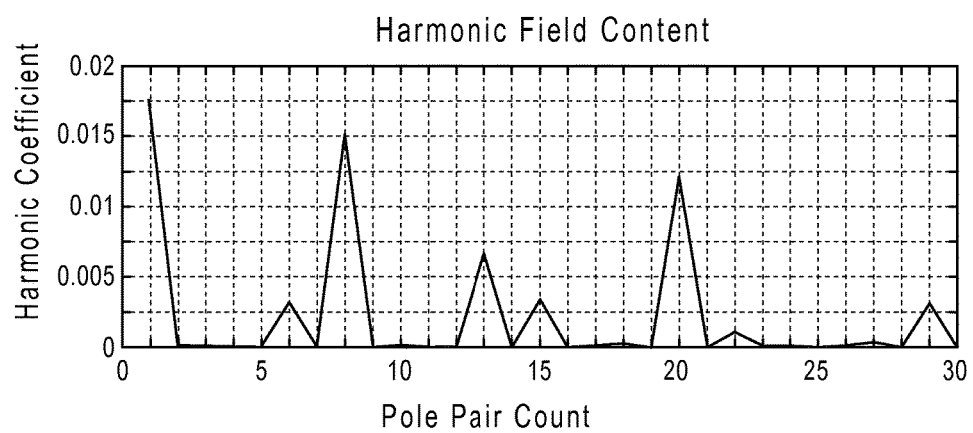

As above, the radial magnetic B field along an inner perimeter 715 of the middle magnet ring 710 may be calculated and represented as a sum of Fourier components to compute the coupling coefficients (i.e., harmonic coefficients), as illustrated in FIG. 15. Thus, the harmonic field content plot illustrated in FIG. 15 demonstrates that an outer gear ring 702 having 40 poles (20 pole pairs) can be made to couple to an inner gear ring (not shown) with 1 pole pair (the normative coupling coefficient), 6 pole pairs, 8 pole pairs, 13 pole pairs, and 15 pole pairs. In other words, by varying the size and radial spacing of the steel wedges 712, new coupling options can now be obtained for 6, 8, 13, and 15 pole pairs on an inner ring, which respectively correspond to gear ratios 3.33:1 (20/6), 2.5:1 (20/8), 1.54:1 (20:13), and 1.33:1 (20:15) for the coupling between the inner gear ring (not shown) and the outer gear ring 702. In particular, two additional strong coupling options are now available for 8 and 13 pole pairs on the inner ring, as illustrated by the two large peaks on the harmonic field content plot of FIG. 15. Thus, two particularly strong couplings are now available for 2 pole pairs (providing a 20:2 gear ratio) and 8 pole pairs (providing a 20:8 gear ratio), as also illustrated by the two largest (i.e., strongest) peaks on the harmonic field content plot of FIG. 15. Consequently, this pairing of interpole elements generally illustrates that clustering the wedges more closely, for example, in groups of three instead of two (which is an integer divisible into 21) may give a more distinct generation of new coupling options between the stator and rotor.

Figure 16:
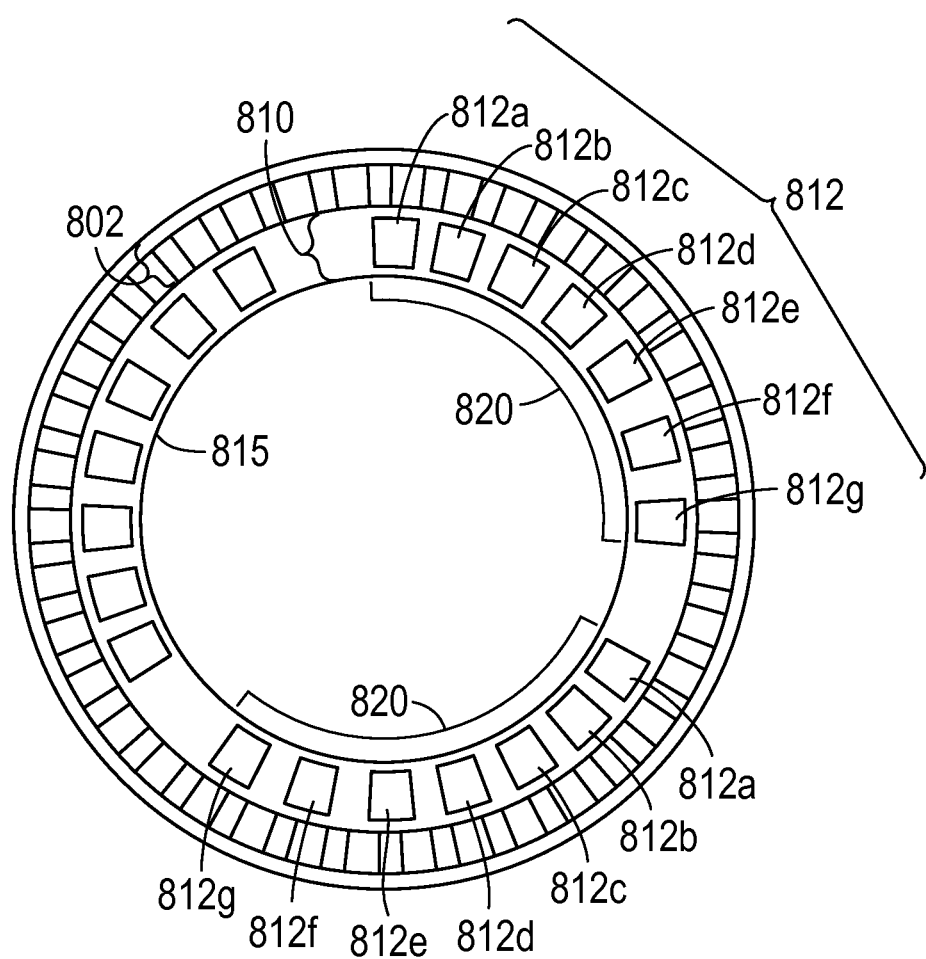
FIG. 16 is a schematic plan view of yet another exemplary configuration of interpole elements in accordance with the present disclosure.
Figure 17A:
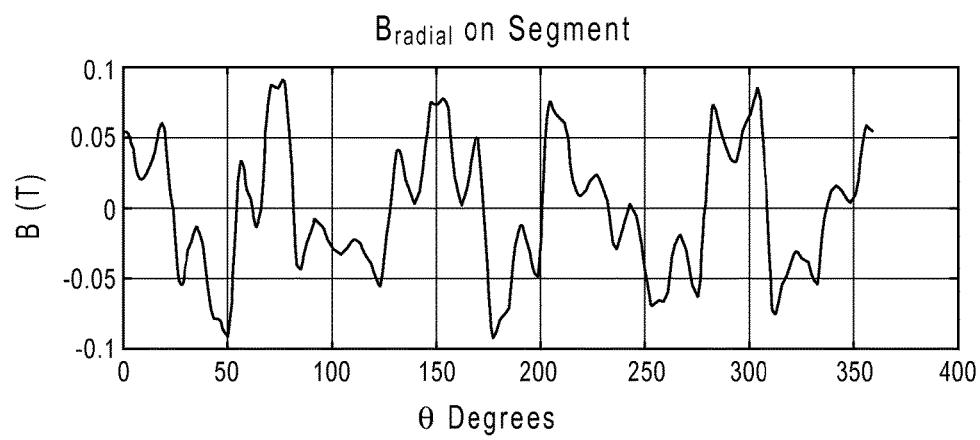
FIGS. 17A and 17B are a radial magnetic B field plot and harmonic field content plot, respectively, for the interpole elements of FIG. 15.
Figure 17B:
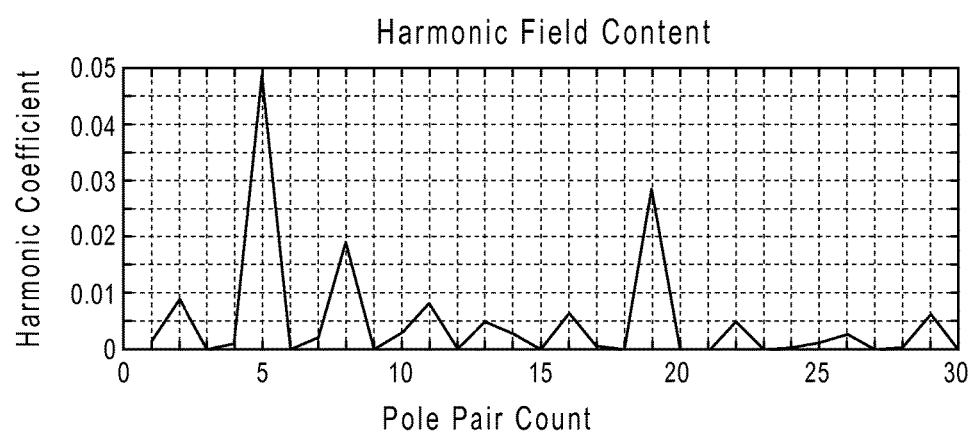

In various further embodiments, as illustrated in FIGS. 16 and 17, not only can additional coupling options be added to the normative coupling coefficient, but the coupling coefficient can be transformed to another value completely. As illustrated in FIG. 16, for example, steel wedges 812 may be clustered into groups 820 of seven wedges 812a, 812b, 812c, 812d, 812e, 812f, and 812g of slightly increasing thickness (e.g., of slightly increasing angular span), with wedge 812g being the thickest wedge in the groups 820. Thus, the 21 wedges illustrated in FIG. 16 are grouped into three groups of seven, wherein each group 820 is spaced approximately 120 degrees from its neighboring group 820. In other words, the azimuthal wedge span of the wedges is alternated between 360/27 degrees, 360/26 degrees, 360/25 degrees, 360/24 degrees, 360/23 degrees, 360/22 degrees, and 360/21 degrees.

As above, the radial magnetic B field along an inner perimeter 815 of the middle gear ring 810 may be calculated and represented as a sum of Fourier components to compute the coupling coefficients (i.e., harmonic coefficients) as illustrated in FIG. 17. Thus, the harmonic field content plot illustrated in FIG. 17 demonstrates that an outer gear ring 802 having 38 poles (19 pole pairs) can be made to couple to an inner gear ring (not shown) with 2 pole pairs, 5 pole pairs, 8 pole pairs, 11 pole pairs, 13 pole pairs, and 16 pole pairs. Particularly, however, the primary coupling (i.e., the strongest coupling) is now to an inner gear ring with 5 pole pairs instead of an inner gear ring with 2 pole pairs, as illustrated by the large peak at a 5 pole pair count on the harmonic field content plot of FIG. 17.

Figure 18:
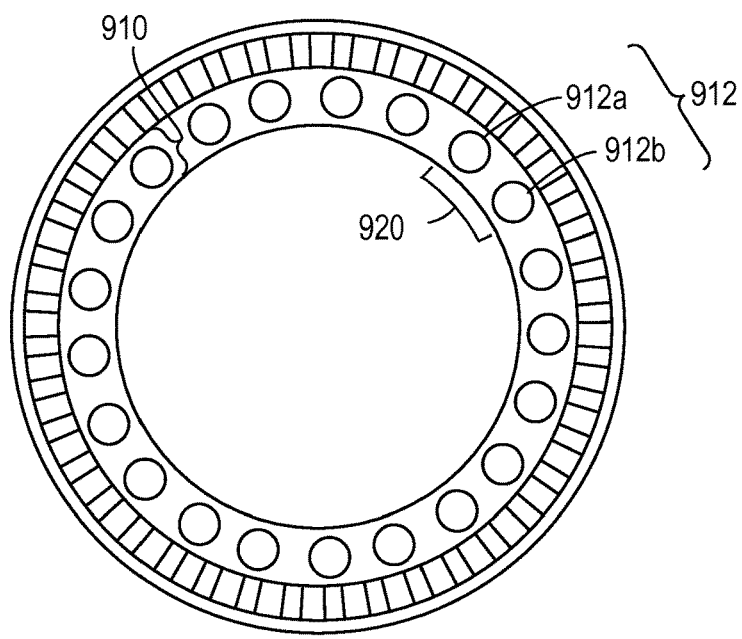
FIG. 18 is a schematic plan view of an another exemplary configuration of interpole elements in accordance with the present disclosure.
Figure 19:
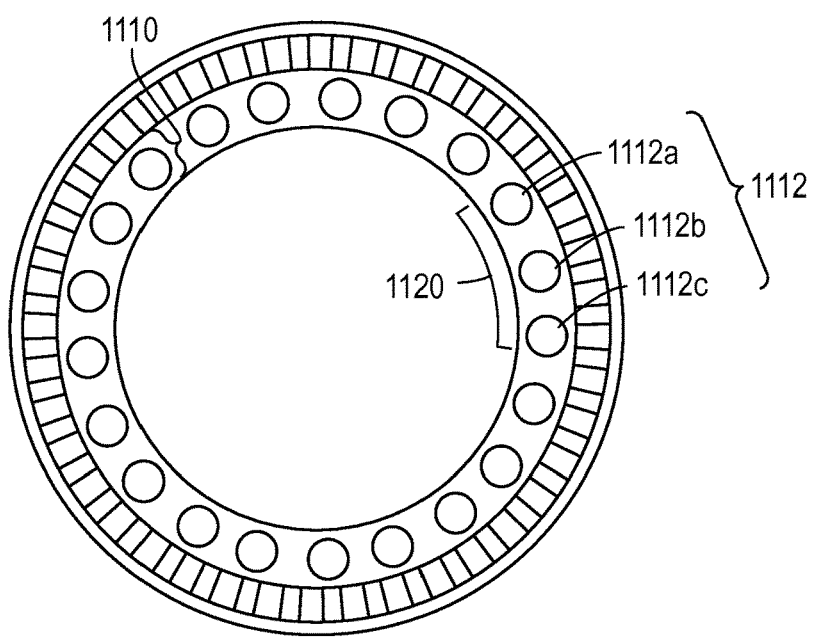
FIG. 19 is a schematic plan view of another exemplary configuration of interpole elements in accordance with the present disclosure.

Those of ordinary skill in the art would understand that the embodiments illustrated in FIGS. 12-17 are exemplary only and that the interpole elements (e.g., steel wedges 612, 712, and 812) can have various sizes, numbers, positions, groupings, shapes, and/or other configurations to achieve a desired coupling coefficient change and thus a desired speed change. As illustrated in FIGS. 18 and 19 (in which, as above, for ease of explanation, a magnetic gear comprising an outer gear ring of permanent magnets is shown instead of a permanent magnet motor comprising an outer stator of windings), for example, various additional embodiments of the present disclosure contemplate varying the size and angular position of free-spinning magnetized elements (e.g., free-spinning magnetized cylinders 912 and 1112 in the middle gear ring 910 and 1110). As shown in FIG. 18, in various embodiments, the cylinders 912 may be clustered into groups 920 of two cylinders 912a and 912b, wherein each cylinder 912a is slightly smaller in diameter than each cylinder 912b. In various exemplary embodiments, the diameter of the cylinders may be selected so as to make them no bigger than the smallest magnet pole pitch, however such size is nonlimiting and other sizes may be selected as desired without departing from the scope of the present disclosure. Similarly, in various additional embodiments, as illustrated in FIG. 19, cylinders 1112 may be clustered into groups 1120 of three cylinders 1112a, 1112b, and 1112c of slightly increasing diameter, with cylinder 1112c having the largest diameter. Furthermore, various exemplary embodiments of the present disclosure contemplate altering only the grouping or clustering of the interpole elements instead of altering both the size and grouping of the interpole elements. In various embodiments, for example, when using free-spinning magnetized elements, such as, for example, free-spinning magnetized cylinders 912 and 1112, only the grouping or clustering of the cylinders may be altered (instead of altering both the size and grouping of the cylinders). In various embodiments, altering the size of the cylinders may not be as desirable since an increase in size generally results in a concomitant increase in the size of the air gap between the stator and rotor. Such an increase in the air gap size may in turn weaken the MMF source. Accordingly, various small clusters of two or three cylinders may yield a relatively clean harmonic coupling coefficient with 2-3 primary pair coefficients. Based on the teachings of the present disclosure, it is therefore within the ability of one skilled in the art to determine an interpole element arrangement to achieve a desired coupling and speed change, and the present disclosure is not intended to be limited to the exemplary embodiments shown and described herein.

Figure 20:
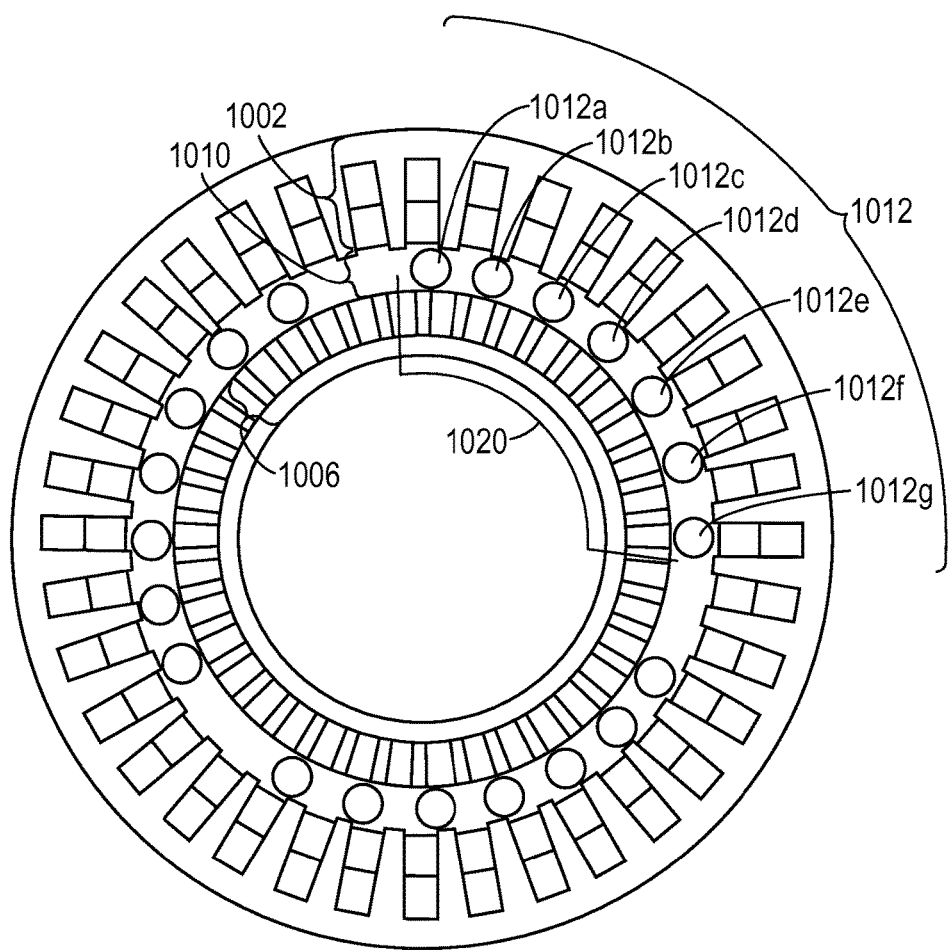
FIG. 20 is a schematic plan view of yet another exemplary configuration of interpole elements in accordance with the present disclosure.

Those of ordinary skill in the art would further understand, that although for ease of explanation, the embodiments discussed above and illustrated in FIGS. 12-19 are with relation to a magnetic gear, the same methods and techniques of varying the size, angular position, and groupings of interpole elements (positioned in an air gap between a permanent magnet stator and rotor) may be applied to change the speed of a magnetic direct drive device, such as, for example, a permanent magnetic motor or generator. As illustrated in FIG. 20, for example, in various exemplary embodiments, free-spinning magnetized elements 1012 may be clustered into groups 1020 of seven elements 1012a, 1012b, 1012c, 1012d, 1012e, 1012f, and 1012g within an air gap 1010 between a stator 1002 and a rotor 1006.

An exemplary method for varying a speed of a magnetic drive device in accordance with an exemplary embodiment of the present disclosure is set forth in the following description with reference to the embodiment of FIGS. 2 and 3. A stator 202 generating a first number of magnetic pole pairs may be harmonically coupled to a rotor 206 providing a second number of magnetic pole pairs, wherein the stator 202 comprises a plurality of electrical field windings 204 and the rotor 206 comprises a plurality of permanent magnets 208.

The number of magnetic pole pairs generated by the stator 202 may then be adjusted to change the number of magnetic pole pairs provided by the stator 202 and thereby change the conversion ratio of the motor 200. In various embodiments, for example, the stator 202 may comprise a plurality of pole change windings, and the number of magnetic pole pairs generated by the stator 202 may be adjusted via the pole change windings.

In various embodiments of the present disclosure, the stator 202 may be coupled to the rotor 206 by positioning a plurality of interpole elements in an air gap 210 between the stator 202 and the rotor 206. For example, in various embodiments, a plurality of free-spinning magnetized cylinders 212 can be positioned between the stator 202 and the rotor 206. In various additional embodiments, although not shown, a plurality of laminated steel blocks or wedges can be positioned between the stator and rotor. In various exemplary embodiments, the plurality of interpole elements may be selectively positioned and sized such that the stator 202 may harmonically couple to the rotor 206 at more than one magnetic pole pair combination, thereby providing multiple speeds. In various embodiments, for example, the interpole elements may be arranged into at least two groups of interpole elements.

Figure 21:
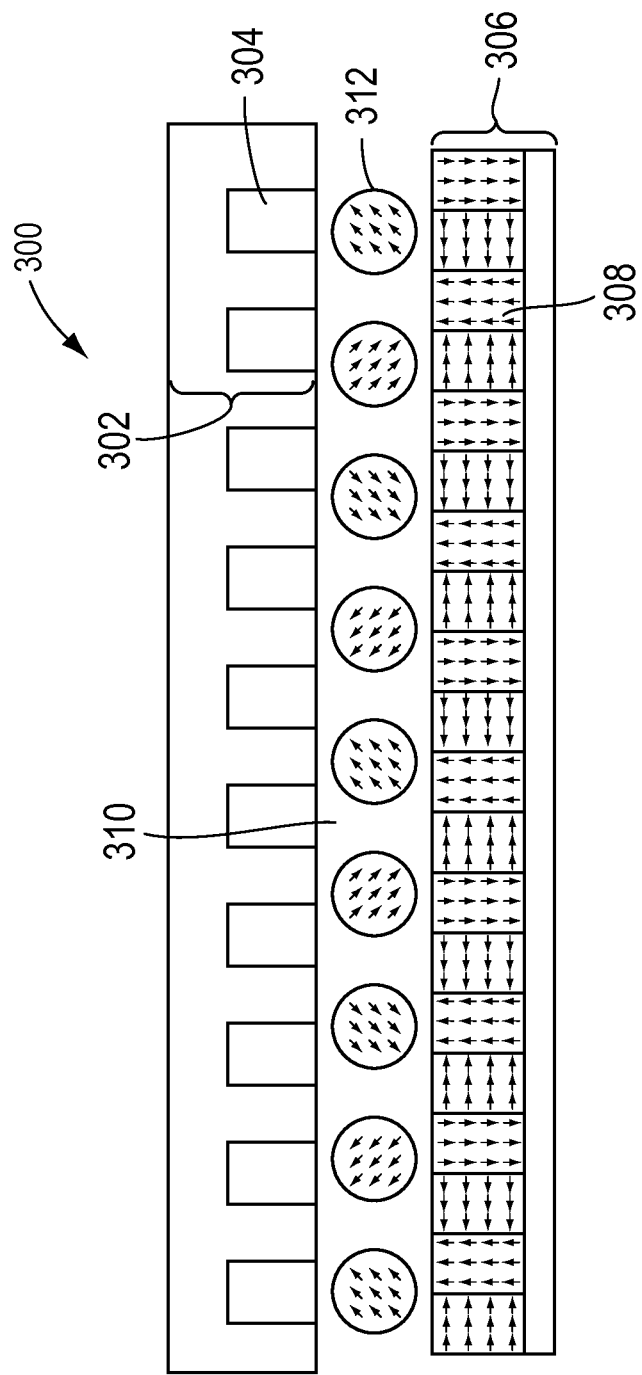
FIG. 21 is a schematic plan view of yet another exemplary embodiment of a permanent magnet motor in accordance with the present disclosure.

The present disclosure contemplates varying the speed of various types, configurations, and/or arrangements of magnetic drive devices. As illustrated in the embodiments depicted in FIGS. 2-11, for example, the speed of a rotary magnetic motor may be changed. However, the present disclosure is not limited to such motors, and in various additional embodiments, for example, the speed of a linear magnetic motor 300, such as, for example, illustrated in FIG. 21, may be changed in the same manner. As shown in FIG. 21, a stator 302 generating a first number of magnetic pole pairs may be harmonically coupled to a rotor 306 providing a second number of magnetic pole pairs, wherein the stator 302 comprises a plurality of electric field windings 304 and the rotor 306 comprises a plurality of permanent magnets 308.

As above, in various embodiments, the stator 302 may comprise a plurality of pole change windings, and the number of magnetic pole pairs generated by the stator 302 may be adjusted via the pole change windings. As shown in FIG. 21, a plurality of free-spinning magnetized elements, such as, for example, free-spinning magnetized cylinders 312, can be positioned in an air gap 310 between the stator 302 and the rotor 306 to harmonically couple the stator 302 to the rotor 306. As above, to provide multiple speeds, in various additional embodiments, although not shown, the interpole elements may be selectively positioned and sized such that the stator 302 may harmonically couple to the rotor 306 at more than one magnetic pole pair combination.

Furthermore, those of ordinary skill in the art would understand that in the same manner the speed of a rotary or linear magnetic generator may be changed. Those of ordinary skill in the art would understand how to arrive at various additional permanent magnet motor and/or generator arrangements and applications based on the exemplary embodiments of the present disclosure.

EXEMPLARY INDUSTRIAL APPLICATIONS

Magnetic direct drives in accordance with the present disclosure may be used in various industrial applications as would be understood by those of ordinary skill in the art. Such applications may include, but are not limited to, hydraulic pumps, drills, and rotating drive shafts, such as, for example, in the hydro-electric industry and in various rotary drive mechanisms used in the oil and gas industry. Regarding the latter, for example, magnetic direct drives in accordance with various exemplary embodiments can be used in rotary equipment, such as top drives, drawworks, or mud pumps, of an oil rig.

Various such components are described below and it should be understood that those having ordinary skill in the art could use any the magnetic direct drives herein, with appropriate modification as would be understood by those of ordinary skill in the art, as a substitute for traditional motor and mechanical gearbox mechanisms, or as a replacement for the magnetic gearing systems and motors described in International PCT Application No. PCT/US13/028538, filed on a date even herewith and incorporated herein by reference in its entirety.

Figure 22:
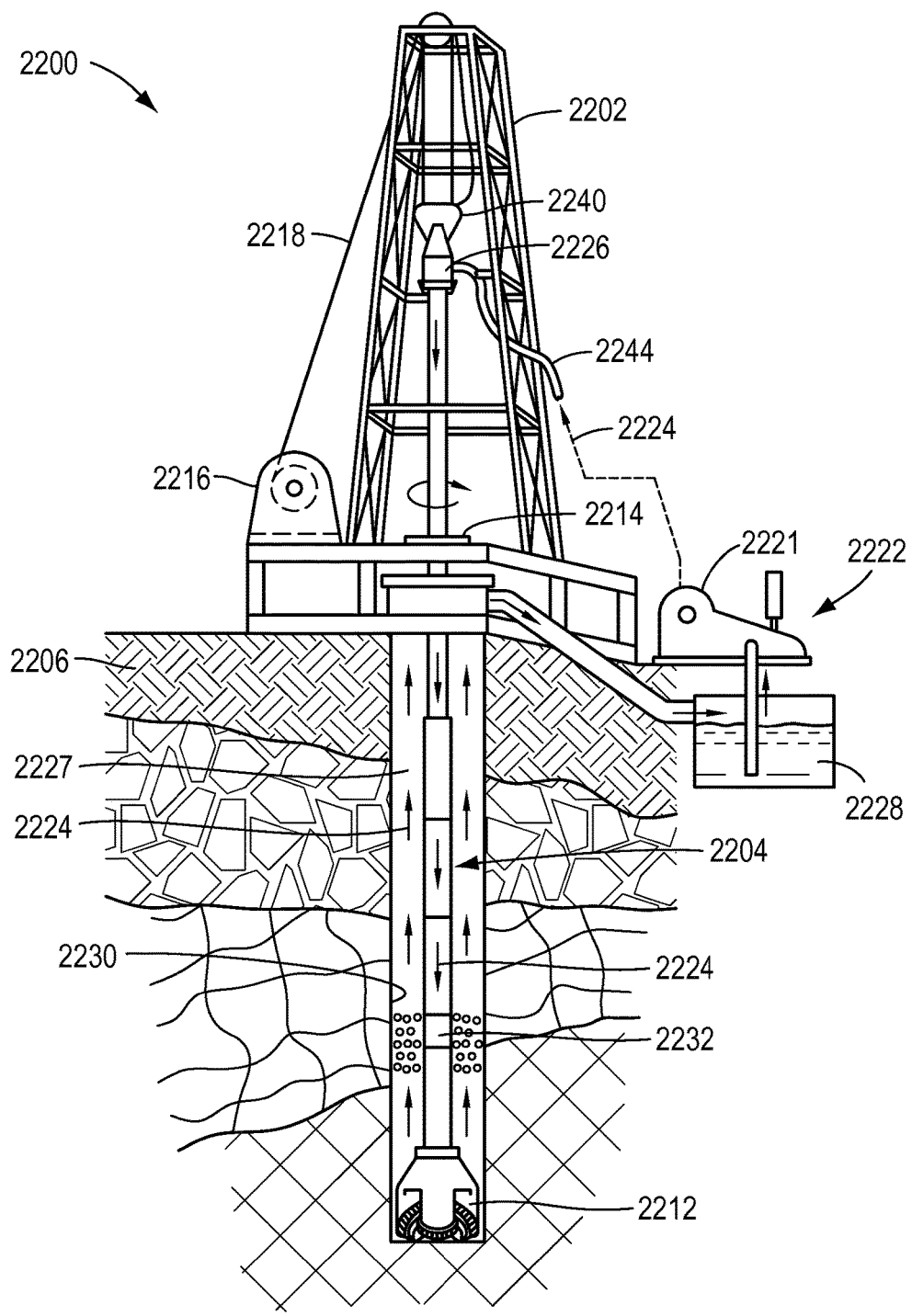
FIG. 22 is a plan view of an exemplary embodiment of an oil drilling rig in accordance with the present disclosure.

FIG. 22 illustrates a schematic diagram depicting an oil rig 2200. The rig 2200 includes a derrick 2202 from which extends a drill string 2204 into the earth 2206. The drill string 2204 can include drill pipes and drill collars. A drill bit 2212 is at the end of the drill string 2204. A rotary system 2214, top drive 2226, and/or a down hole drive 2232 (e.g., a "fluid motor", "mud motor", electric, hydraulic, mud, fluid, or other type based on available utilities or other operational considerations) may be used to rotate the drill string 2204 and the drill bit 2212. The top drive 2226 is supported under a travelling block 2240, which can travel up and down in the derrick 2202. A drawworks 2216 has a cable or rope apparatus 2218 for supporting items in the derrick 2202 including the top drive 2226. A system 2222 with one, two, or more mud pump systems 2221 supplies drilling fluid 2224 using hose 2244 to the drill string 2204, which passes through the center of the top drive 2226. Drilling forms a wellbore 2230 extending down into the earth 2206.

During drilling, the drilling fluid 2224 is pumped by mud pump(s) 2221 of the system 2222 into the drill string 2204 passing through the top drive 2226 (thereby operating a downhole drive 2232 if such is used). Drilling fluid 2224 flows to the drill bit 2212, and then flows into the wellbore 2230 through passages in the drill bit 2212. Circulation of the drilling fluid 2224 transports earth and/or rock cuttings, debris, etc. from the bottom of the wellbore 2230 to the surface through an annulus 2227 between a well wall of the wellbore 2230 and the drill string 2204. The cuttings are removed from the drilling fluid 2224 so that the fluid may be re-circulated from a mud pit or container 2228 by the pump(s) of the system 2222 back to the drill string 2206. In operation, the rotary equipment, such as top drive 2226, drawworks 2216, mud pumps 2221, may be driven by motors, which can provide large torque at low speed.

Figure 23:
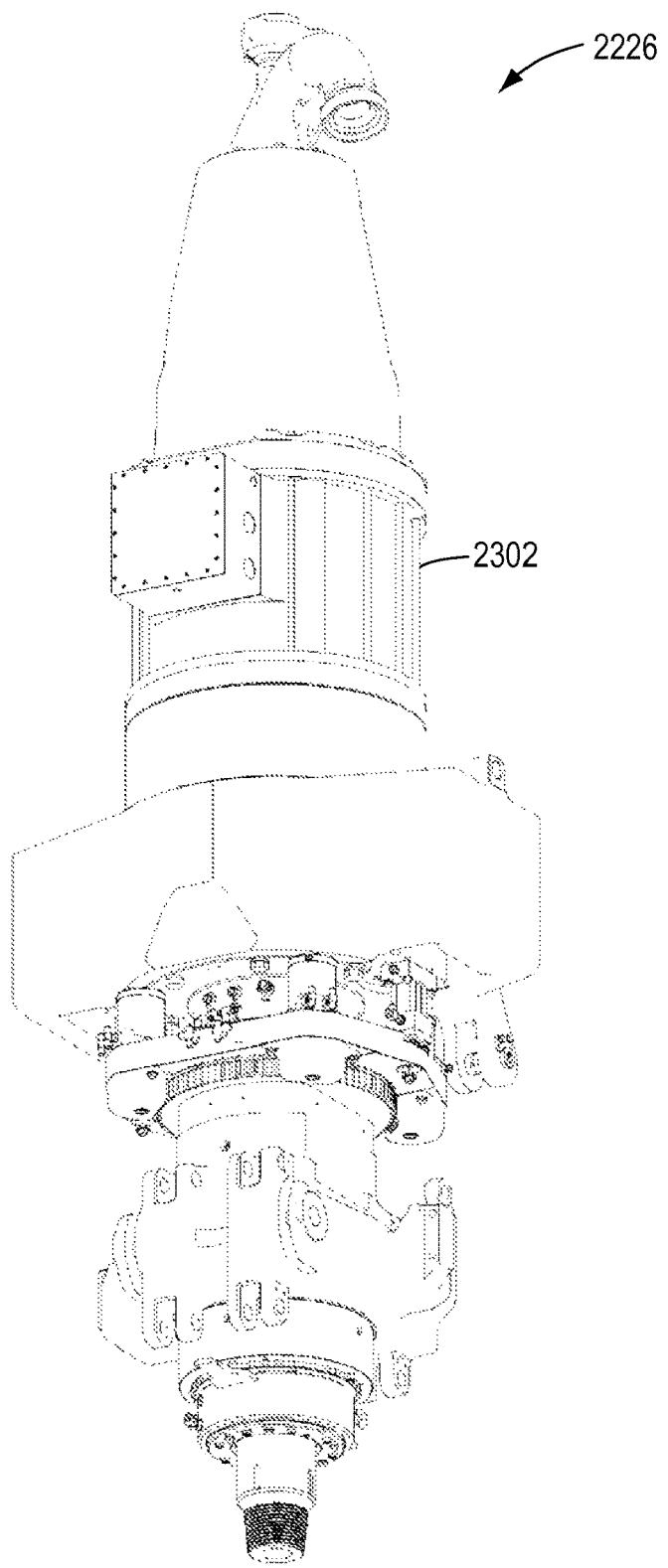
FIG. 23 is a perspective view of an exemplary embodiment of a top drive mechanism in accordance with the present disclosure.

As shown in FIG. 23, for example, in various embodiments of the present disclosure, the top drive-mechanism 2226 may comprise an electrical motor drive unit 2302, which may house a permanent magnet direct drive motor in accordance with any of the exemplary embodiments of the present disclosure. Ordinarily skilled artisans would understand how to modify the various permanent magnet motors disclosed herein to adapt those motors for use with such applications.

It is further contemplated that the magnetic direct drives in accordance with exemplary embodiments herein may be used for other applications at the oil rig, such as drawworks or mud pumps. Reference is made to International PCT Application No. PCT/US13/028538, filed on a date even herewith, and incorporated by reference herein for further details regarding top drives, drawworks, and mud pumps with which the magnetic direct drive motors of the present disclosure may be utilized.

Figure 24:
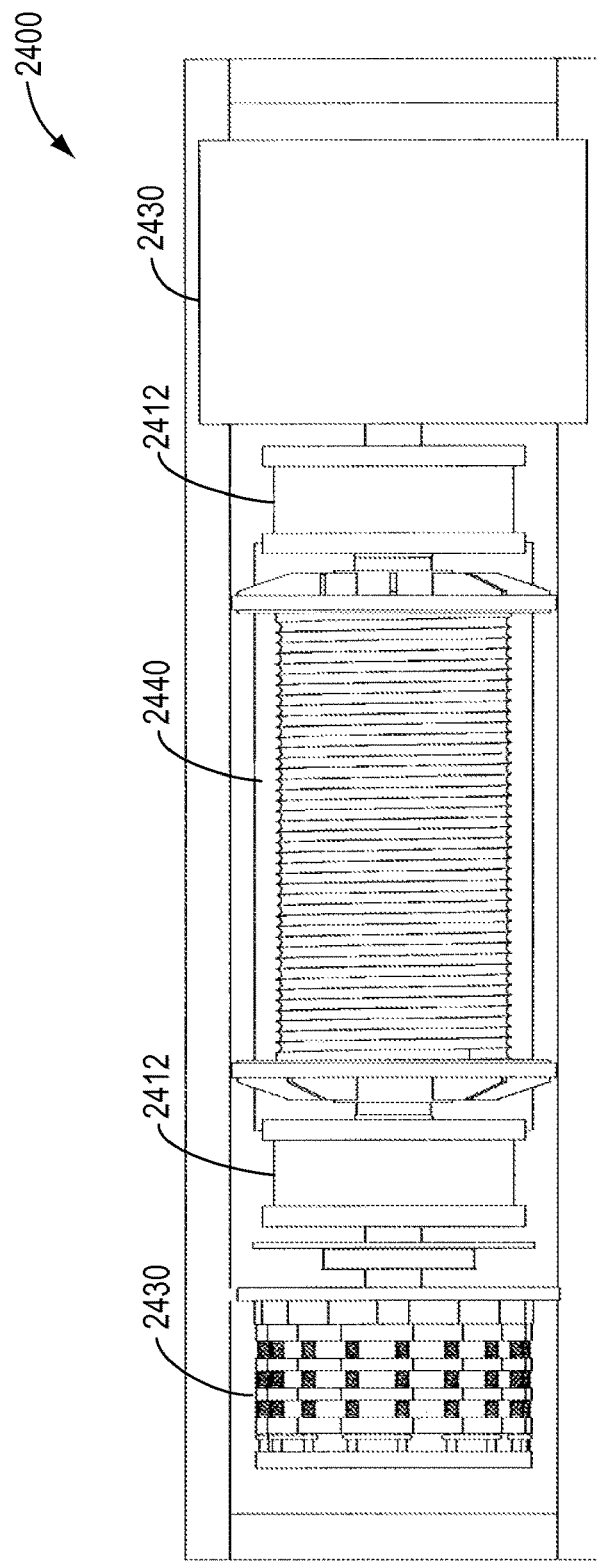
FIG. 24 is a top plan view of an exemplary embodiment of a drawworks in accordance with the present disclosure.

FIG. 24 illustrates an exemplary embodiment of drawworks that uses magnetic direct drive motors in accordance with an exemplary embodiment. In these cases, the motors are arranged horizontally, rather than vertically as with top drives of FIG. 23. The drawworks may be on a different axle with respect to gearboxes, brakes and drums, or, may be co-axial, co-linear and/or concentric. The magnetic drives may be selected to provide variable speeds or torques (e.g. continuously variable speed), in a manner as described above, for the drawworks, which can match the needs at various phases of the rig operation.

FIG. 24 shows a drawworks 2402 with magnetic direct drives 2412, two brakes 2430 and a drum 2440. The magnetic direct drives 2412 are arranged on opposite sides of the drum 2440. As shown in FIG. 22, the drawworks 2402 may be rotationally activated to selectively reel in or reel out cable (see 2218 in FIG. 22) for use at the oil rig.

Figure 25:
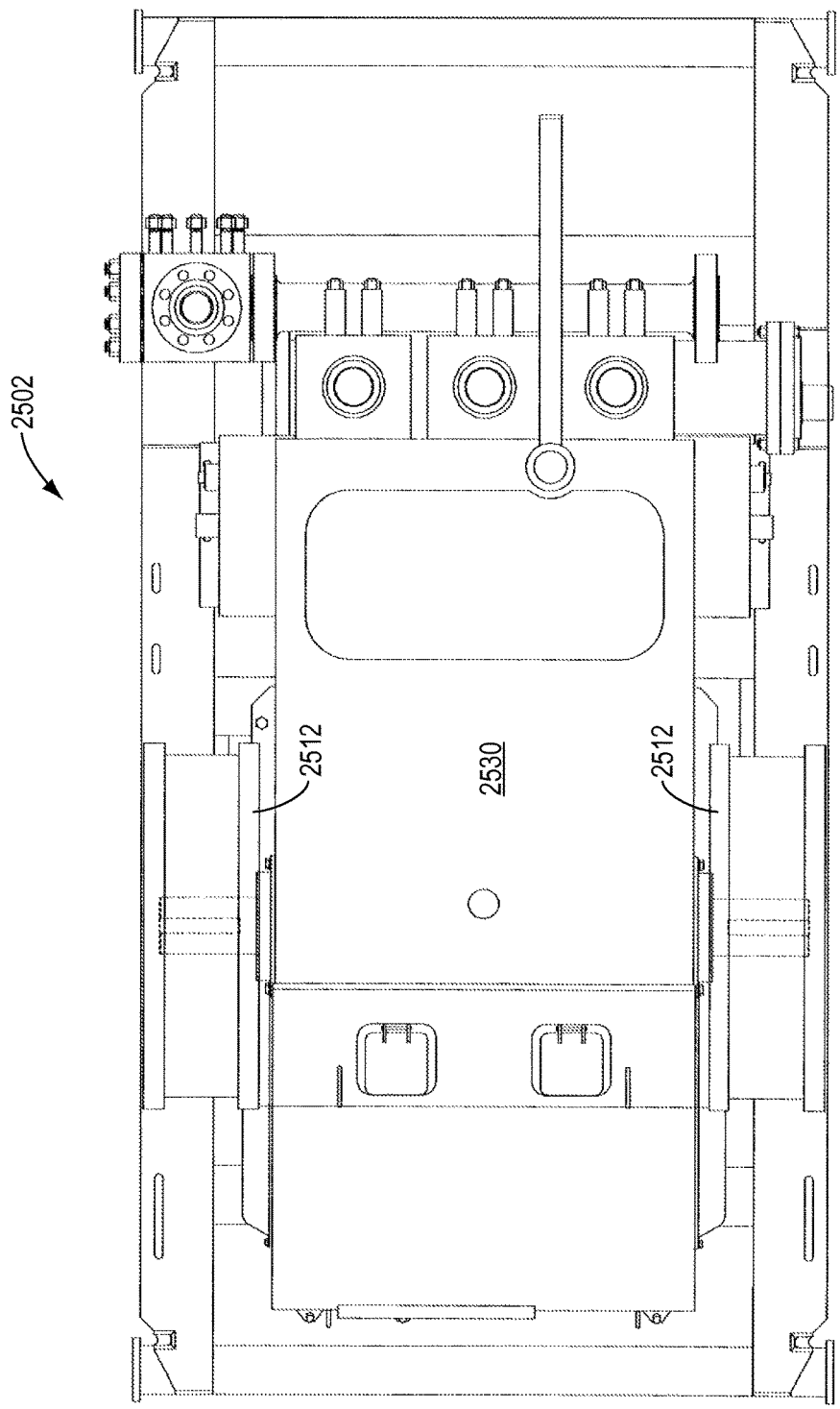
FIG. 25 is a top plan view of an exemplary embodiment of a mud pump in accordance with the present disclosure.

FIG. 25 illustrates an exemplary embodiment of a mud pump with magnetic direct drives. The mud pump 2502 includes a magnetic direct drive and a pump 2530. As shown and described with reference to FIG. 22, the mud pump 2502 may be used to pump fluid through the drill string 2906 and back to the surface. Similar to the magnetic drives implemented in drawworks as described herein, magnetic drives may be implemented with mud pumps to provide a wide range of power, speed and torque in accordance with varying the same as described herein. FIG. 25 shows a mud pump 2502 with two magnetic direct drives 2512 in accordance with any of the various exemplary embodiments of the present disclosure.

In various exemplary embodiments of the applications described above, it is desirable that the magnetic direct drive systems provide relatively high torque densities. For example, for a top drive with a 20,000 ft-lb continuous torque rating with a diameter of about 24 inches and height of 17 inches, a torque density of about 2.6 ft-lb/in$^3$ may be desirable.

As depicted in the various configurations shown herein, various combinations of one or more magnetic direct drives may be used with various rotary equipment in the oil drilling rig to generate desired output. The rotary equipment having the magnetic drives described above may be used in a new oil rig or be retrofitted to an existing oil rig.

One exemplary method of driving rotary equipment of an oil drilling rig (the rotary equipment having an input shaft and an output shaft) involves operatively connecting at least one magnetic direct drive to the rotary equipment of a component of an oil drilling rig. The magnetic direct drive(s) may be any of the exemplary embodiments described herein. The method can further include rotating the rotary equipment at a desired rotational speed by selectively translating torque from the output shaft/rotor of the magnetic direct drive.

The coupling may involve replacing a mechanical gear and motor of a rotary driver of an oilfield with the magnetic direct drives. The method may be performed in any order and repeated as desired.

Although only a few exemplary embodiments have been described in detail above, those skilled in the art will readily appreciate that many modifications are possible in the example embodiments without materially departing from this disclosure. Accordingly, all such modifications are intended to be included within the scope of this disclosure as defined in the following claims. For example, it should be understood that the exemplary industrial applications described herein are nonlimiting, and the magnetic direct drives in accordance with various exemplary embodiments may be used in numerous applications to drive rotary equipment, as well as other mechanisms with appropriate linkages and couplings as would be understood by those having ordinary skill in the art.

Those having ordinary skill in the art will recognize that various modifications may be made to the configuration and methodology of the exemplary embodiments disclosed herein without departing from the scope of the present disclosure. By way of example only, the cross-sectional shapes and relative sizes of the stator and rotor may be modified and a variety of cross-sectional configurations may be utilized, including, for example, circular or oval cross-sectional shapes.

Those having ordinary skill in the art also will appreciate that various features disclosed with respect to one exemplary embodiment herein may be used in combination with other exemplary embodiments with appropriate modifications, even if such combinations are not explicitly disclosed herein. Elements and materials, and arrangements of those elements and materials, may be substituted for those illustrated and described herein, and portions may be reversed, all as would be apparent to one skilled in the art after having the benefit of the description herein. Changes may be made in the elements described herein without departing from the spirit and scope of the present disclosure and following claims, including their equivalents.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the magnetic drive devices and methods of the present disclosure without departing from the scope the present disclosure and appended claims. Other embodiments of the disclosure will be apparent to those skilled in the art from consideration of the specification and practice of the disclosure disclosed herein. It is intended that the specification and examples be considered as exemplary only.

The invention claimed is:

1. A magnetic drive device comprising:
a stator comprising a plurality of windings for generating a first number of magnetic pole pairs;
a rotor comprising a plurality of permanent magnets for generating a second number of magnetic pole pairs that differs from the first number of magnetic pole pairs; and
a plurality of magnetized interpole elements disposed within an air gap between the stator and the rotor,
wherein each magnetized interpole element of the plurality of magnetized interpole elements is configured to individually rotate about an axis of rotation respectively defined by each magnetized interpole element to produce a magnetomotive force and harmonically modulate the magnetic pole pairs of the stator with the magnetic pole pairs of the rotor.

2. The device of claim 1, wherein the rotor is positioned radially inwardly of the stator.

3. The device of claim 1, wherein the second number of magnetic pole pairs is greater than the first number of magnetic pole pairs.

4. The device of claim 1, wherein the plurality of windings extend radially inward in a spaced relation around an interior diameter of the stator.

5. The device of claim 4, wherein the rotor is a rotary rotor.

6. The device of claim 1, wherein the rotor is a linear rotor.

7. The device of claim 1, wherein the plurality of permanent magnets are arranged in a partial Halbach array.

8. The device of claim 1, wherein the plurality of magnetized interpole elements comprise a plurality of magnetized cylinders.

9. The device of claim 1, wherein the plurality of magnetized interpole elements comprise a plurality of permanent magnets.

10. The device of claim 1, wherein the plurality of windings comprise pole change windings.

11. The device of claim 10, wherein the plurality of magnetized interpole elements are arranged into at least two groups of interpole elements.

12. The device of claim 1, wherein the stator is configured as a sink for electricity.

13. The device of claim 1, wherein the stator is configured as a source of electricity.

14. A system comprising:
the magnetic drive device of claim 1;
rotary equipment associated with an oil drilling rig operatively coupled to be driven by an output drive shaft of the magnetic drive device.

15. The system of claim 14, wherein the rotary equipment is chosen from a top drive, a mud pump, and a drawworks.

16. The system of claim 14, wherein the magnetic drive device is configured to drive the rotary equipment at relatively low speed and high torque.

17. A magnetic drive device comprising:
a stator comprising a plurality of pole change windings for generating a first number of magnetic pole pairs, wherein the pole change windings are configured to change the generated first number of magnetic pole pairs;
a rotor comprising a plurality of permanent magnets for generating a second number of magnetic pole pairs that differs from the first number of magnetic pole pairs; and
a plurality of interpole elements positioned in an air gap between the stator and the rotor, wherein a size of the interpole elements and a circumferential spacing between adjacent interpole elements varies for at least some of the plurality of interpole elements so as to harmonically couple the magnetic pole pairs of the stator with the magnetic pole pairs of the rotor for each generated first number of magnetic pole pairs.

18. The device of claim 17, wherein the rotor is positioned radially inwardly of the stator.

19. The device of claim 17, wherein the second number of magnetic pole pairs is greater than the first number of magnetic pole pairs.

20. The device of claim 17, wherein the plurality of permanent magnets are arranged in a partial Halbach array.

21. The device of claim 17, wherein the plurality of interpole elements comprise a plurality of free-spinning magnetized cylinders.

22. The device of claim 21, wherein the plurality of free-spinning magnetized cylinders are grouped into at least two groups of free-spinning magnetized cylinders, wherein, within each group, a diameter of each free-spinning magnetized cylinder varies.

23. The device of claim 17, wherein the plurality of interpole elements comprise a plurality of magnetizable wedges.

24. The device of claim 23, wherein the plurality of magnetizable wedges are grouped into at least two groups of magnetizable wedges, wherein, within each group, a thickness of each magnetizable wedge varies.

25. A method of varying a speed of a magnetic drive device, the method comprising:
adjusting a number of magnetic pole pairs generated by a stator;
harmonically coupling the magnetic pole pairs generated by the stator with magnetic pole pairs of a rotor for at least two differing numbers of magnetic pole pairs of the stator from the adjusting,
wherein the harmonically coupling comprises individually rotating about a respective axis of rotation a plurality of magnetized interpole elements disposed within an air gap between the stator and the rotor.

26. The method of claim 25, wherein magnetized interpole elements are magnetized cylinders.

27. The method of claim 25, wherein the harmonically coupling comprises arranging the plurality of magnetized interpole elements into at least two groups.

* * * * *